US012610412B2

(12) United States Patent
Hung et al.

(10) Patent No.: US 12,610,412 B2
(45) Date of Patent: Apr. 21, 2026

(54) METHOD AND APPARATUS FOR SUPPORTING U2U RELAY COMMUNICATION VIA Layer-2 U2U RELAY IN A WIRELESS COMMUNICATION SYSTEM

(71) Applicant: ASUS Technology Licensing Inc., Taipei City (TW)

(72) Inventors: Chen-Hsiang Hung, Taipei City (TW); Li-Te Pan, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/276,515

(22) Filed: Jul. 22, 2025

(65) Prior Publication Data

US 2026/0032743 A1    Jan. 29, 2026

Related U.S. Application Data

(60) Provisional application No. 63/674,714, filed on Jul. 23, 2024.

(51) Int. Cl.
H04W 76/14 (2018.01)
H04W 88/04 (2009.01)

(52) U.S. Cl.
CPC ............ H04W 76/14 (2018.02); H04W 88/04 (2013.01)

(58) Field of Classification Search
CPC ..... H04W 76/14; H04W 88/04; H04W 40/22; H04W 40/24
See application file for complete search history.

(56) References Cited

U.S. PATENT DOCUMENTS

| | | | | |
|---|---|---|---|---|
| 12,156,274 | B1 * | 11/2024 | Ferdi | H04W 76/14 |
| 2023/0217346 | A1 * | 7/2023 | Kuo | H04W 40/246 |
| | | | | 370/315 |
| 2023/0328828 | A1 * | 10/2023 | Wu | H04W 76/38 |
| | | | | 370/315 |
| 2024/0080730 | A1 * | 3/2024 | Zhang | H04W 36/033 |
| 2024/0292291 | A1 * | 8/2024 | Orsino | H04W 76/19 |
| 2024/0349084 | A1 * | 10/2024 | Perras | H04W 36/16 |
| 2025/0393081 | A1 * | 12/2025 | Sarathchandra | H04W 74/085 |

OTHER PUBLICATIONS

Vivo, OPPO; Encoding of direct link modification messages and parameters; 3GPP TSG-CT WG1 Meeting #122-e; meeting; Feb. 20-28, 2020; 3GPP TS 24.587 v1 .0.1; pp. 1-2 (Year: 2020).*
ZTE, OPPO, InterDigital, Nokia, Nokia Shanghai Bell, "Definition of PC5 QoS rules IE", 3GPP TS 24.554v1.0.0, Agenda Item: 17.2.18, C1-22xxxx was C1-220212, 3GPP TSG-CT WG1 Meeting #133bis-e, E-meeting, Jan. 17-21, 2022.

(Continued)

*Primary Examiner* — Farid Seyedvosoghi
(74) *Attorney, Agent, or Firm* — Blue Capital Law Firm, P.C.

(57) ABSTRACT

A method and device for a first User Equipment (UE) are disclosed. In one embodiment, the first UE establishes a PC5 connection with a second UE for supporting a UE-to-UE (U2U) relay communication. The first UE also sends to the second UE a message to trigger a negotiated relay reselection, wherein the message includes a relay reselection indication information element (IE) and a link modification operation code IE set to a specific value.

10 Claims, 22 Drawing Sheets

(56)          References Cited

OTHER PUBLICATIONS

CATT, "One or more V2X service identifiers", Work item code: TEI17, eV2XARC, Category F, C1-21xxxx was C1-210859, 3GPP TSG-CT WG1 Meeting #128-e, Electronic meeting, Feb. 25-Mar. 5, 2021.
Vivo, OPPO, "Encoding of direct link modification messages and parameters" Spec: 3GPP TS 24.587 v1.0.1, Agenda item: 16.2.13, C1-200441, 3GPP TSG-CT WG1 Meeting #122-e, Electronic meeting; Feb. 20-28, 2020.
Nokia, Nokia Shanghai Bell, "Defining the 5G ProSe signalling messages", Spec: 3GPP TS 24.554 V0.2.0, Agenda item: 17.2.18, C1-21xxxx was C1-213204, 3GPP TSG-CT WG1 Meeting #130-e, Electronic meeting; May 20-28, 2021.

* cited by examiner

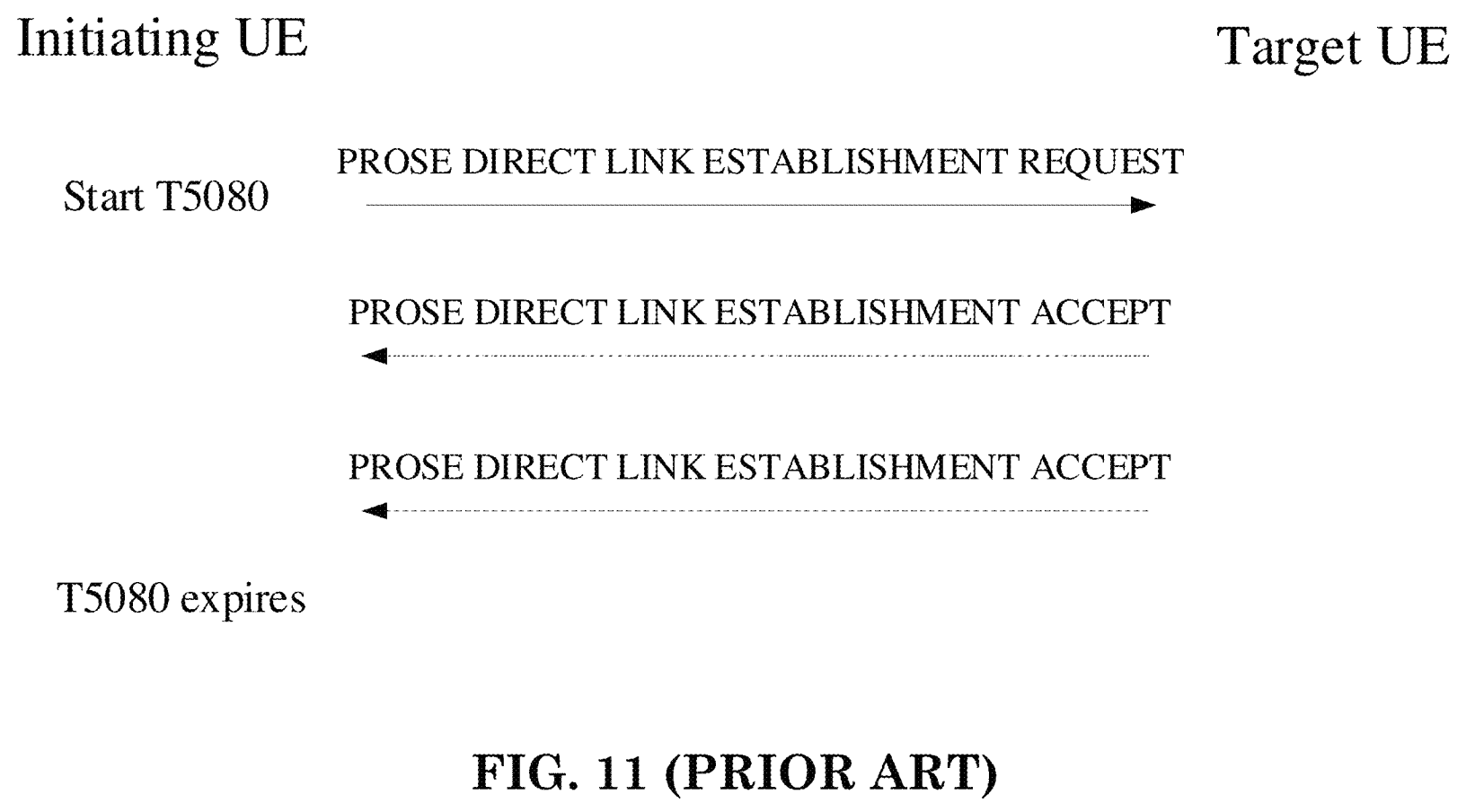

Target UE

Initiating UE

PROSE DIRECT LINK ESTABLISHMENT REQUEST

PROSE DIRECT LINK ESTABLISHMENT ACCEPT

PROSE DIRECT LINK ESTABLISHMENT ACCEPT

Start T5080

T5080 expires

FIG. 11 (PRIOR ART)

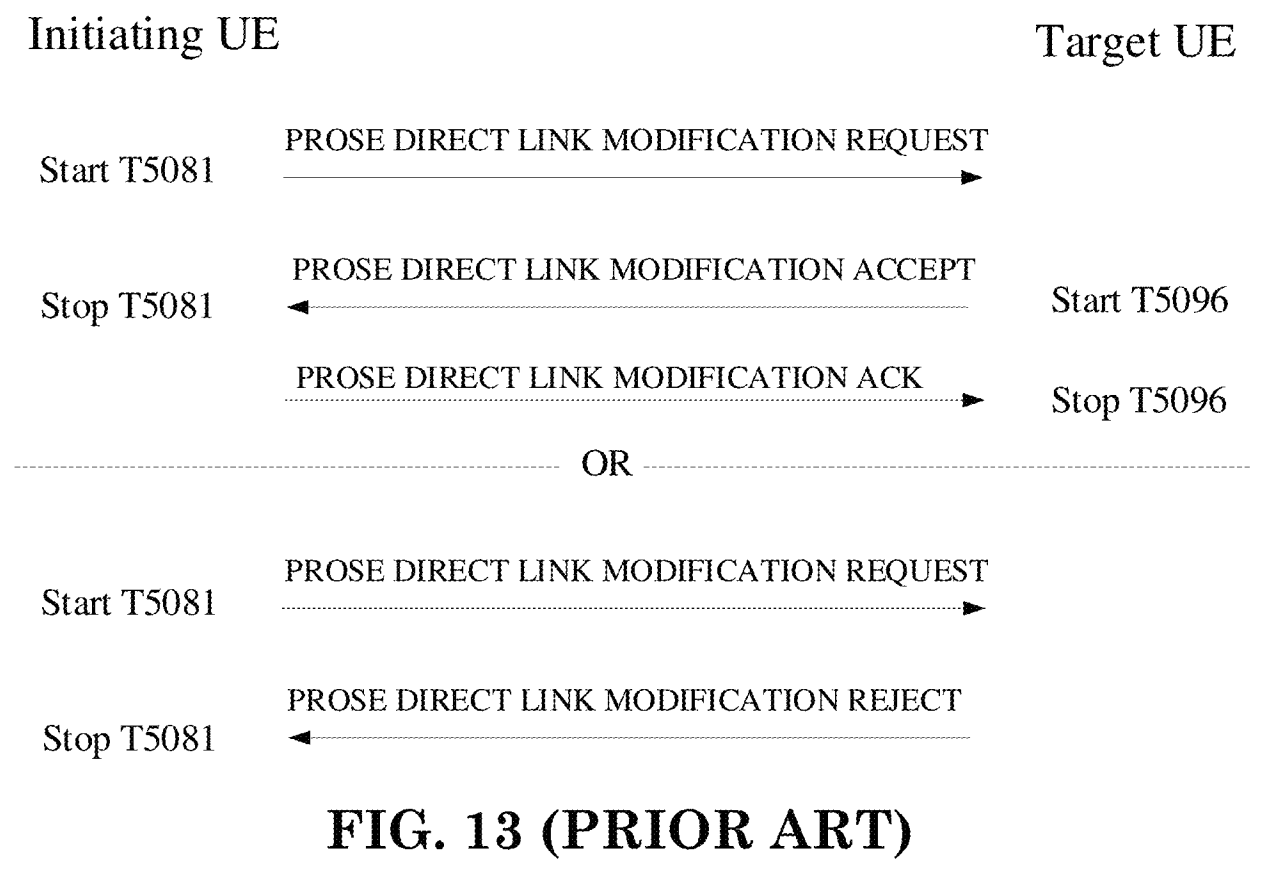

Initiating UE

Target UE

Start T5081

PROSE DIRECT LINK MODIFICATION REQUEST

PROSE DIRECT LINK MODIFICATION ACCEPT

Start T5096

Stop T5081

PROSE DIRECT LINK MODIFICATION ACK

Stop T5096

OR

Start T5081

PROSE DIRECT LINK MODIFICATION REQUEST

Stop T5081

PROSE DIRECT LINK MODIFICATION REJECT

FIG. 13 (PRIOR ART)

| IEI | Information Element | Type/Reference | Presence | Format | Length |
|---|---|---|---|---|---|
| | PROSE DIRECT LINK MODIFICATION REQUEST message identity | ProSe PC5 signalling message type 11.3.1 | M | V | 1 |
| | Sequence number | Sequence number 11.3.2 | M | V | 1 |
| | Link modification operation code | Link modification operation code 11.3.19 | M | V | 1 |
| | QoS flow descriptions | PC5 QoS flow descriptions 11.3.5 | M | LV-E | 5-65537 |
| 7C | QoS rules | PC5 QoS rules 11.3.29 | O | TLV-E | 7-65538 |
| 66 | Source end UE info | Application layer ID 11.3.4 | O | TLV | 3-257 |
| 67 | Target end UE info | Application layer ID 11.3.4 | O | TLV | 3-257 |
| 2D | Target end UE layer-2 ID | Layer-2 ID 11.3.25 | O | TV | 4 |
| 33 | Source 5G ProSe layer-3 end UE MAC address | MAC address 11.3.45 | O | TLV | 8 |
| 9- | Relay reselection indication | Relay reselection indication 11.3.46 | O | TV | 1 |
| 2F | List of candidates U2U relay UE info | List of user info ID 11.3.47 | O | TLV | 7-257 |
| 30 | Source end UE IP address | UE IP address 11.3.49 | O | TLV | 7-19 |
| 31 | List of target end UE IP addresses | List of UE IP addresses 11.3.n | O | TLV | 9-257 |
| 32 | List of candidates U2U relay UE layer-2 ID | List of candidates U2U relay UE layer-2 IDs 11.3.48 | O | TLV | 5-257 |
| 50 | New MSBs of $K_{NRP}$ ID | MSBs of $K_{NRP}$ ID 2 11.3.52 | O | TLV | 4 |

FIG. 14 (PRIOR ART)

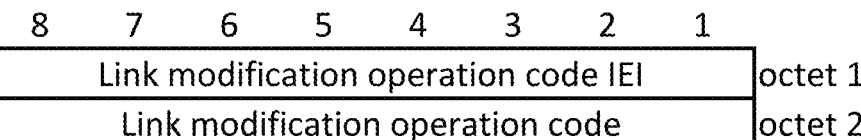

| 8 | 7 | 6 | 5 | 4 | 3 | 2 | 1 | |
|---|---|---|---|---|---|---|---|---|
| Link modification operation code IEI | | | | | | | | octet 1 |
| Link modification operation code | | | | | | | | octet 2 |

FIG. 15 (PRIOR ART)

Link modification operation code (octet 2)
Bits
4 3 2 1
0 0 0 1    void
0 0 1 0    void
0 0 1 1    Add new PC5 QoS flow(s) to the existing 5G ProSe direct link
0 1 0 0    Modify PC5 QoS parameters of the existing PC5 QoS flow(s)
0 1 0 1    Remove existing PC5 QoS flow(s) from the existing 5G ProSe direct link
0 1 1 0    Associate new ProSe application(s) with existing PC5 QoS flow(s)
0 1 1 1    Remove ProSe application(s) from existing PC5 QoS flow(s)
1 0 0 0    Add new 5G ProSe layer-3 end UE to the existing 5G ProSe direct link
1 0 0 1    Remove 5G ProSe layer-3 end UE from the existing 5G ProSe direct link
1 0 1 0    Add new 5G ProSe layer-2 end UE to the existing 5G ProSe direct link
1 0 1 1
   to       Spare
1 1 1 0
1 1 1 1    Reserved Bit 5 to 8 of octet 2 are spare and shall be coded as zero.

FIG. 16 (PRIOR ART)

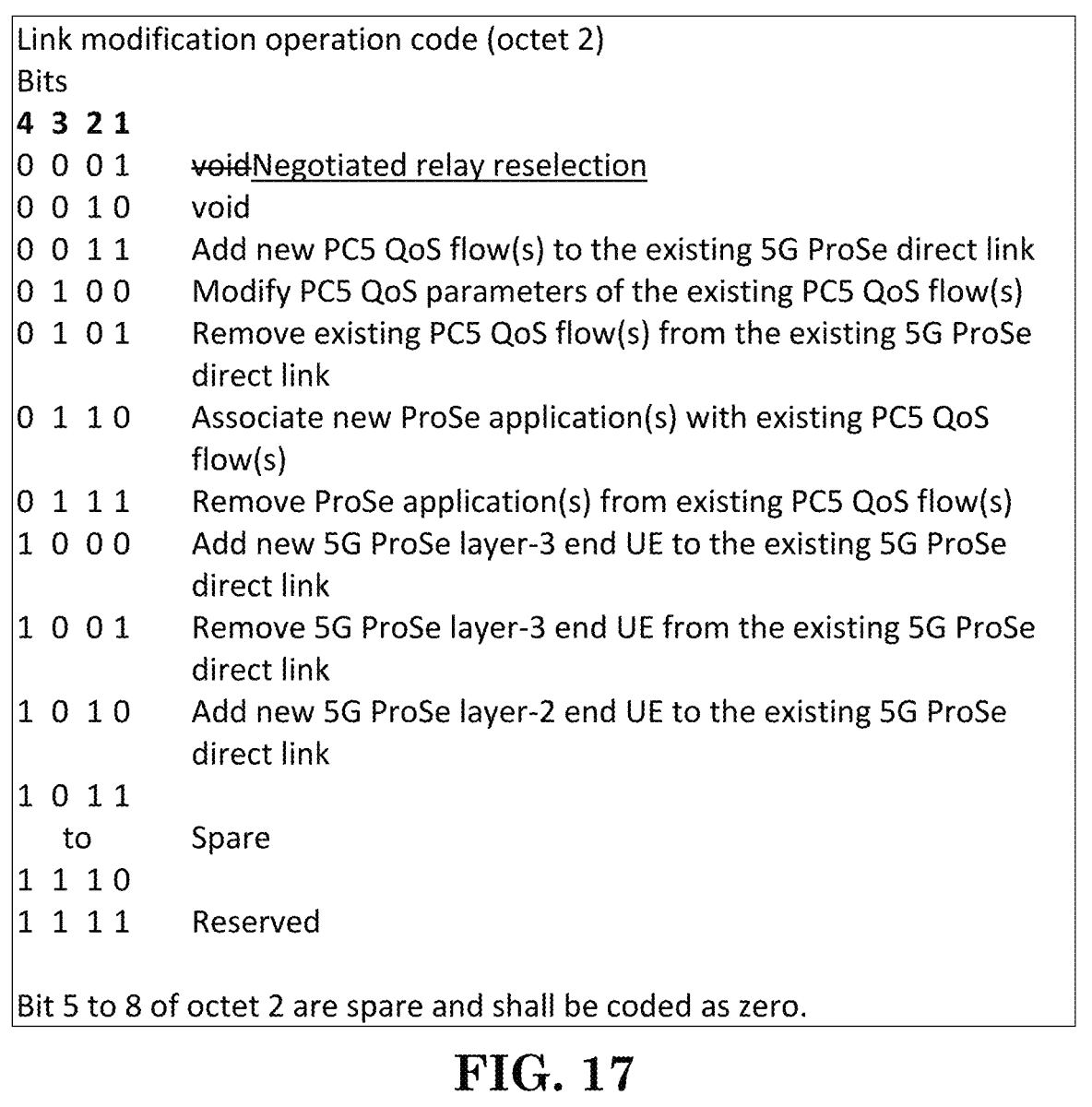

Link modification operation code (octet 2)
Bits
4 3 2 1
0 0 0 1    ~~void~~Negotiated relay reselection
0 0 1 0    void
0 0 1 1    Add new PC5 QoS flow(s) to the existing 5G ProSe direct link
0 1 0 0    Modify PC5 QoS parameters of the existing PC5 QoS flow(s)
0 1 0 1    Remove existing PC5 QoS flow(s) from the existing 5G ProSe
           direct link
0 1 1 0    Associate new ProSe application(s) with existing PC5 QoS
           flow(s)
0 1 1 1    Remove ProSe application(s) from existing PC5 QoS flow(s)
1 0 0 0    Add new 5G ProSe layer-3 end UE to the existing 5G ProSe
           direct link
1 0 0 1    Remove 5G ProSe layer-3 end UE from the existing 5G ProSe
           direct link
1 0 1 0    Add new 5G ProSe layer-2 end UE to the existing 5G ProSe
           direct link
1 0 1 1
   to      Spare
1 1 1 0
1 1 1 1    Reserved Bit 5 to 8 of octet 2 are spare and shall be coded as zero.

FIG. 17

| IEI | Information Element | Type/Reference | Presence | Format | Length |
|---|---|---|---|---|---|
| | PROSE DIRECT LINK MODIFICATION REQUEST message identity | ProSe PC5 signalling message type 11.3.1 | M | V | 1 |
| | Sequence number | Sequence number 11.3.2 | M | V | 1 |
| | Link modification operation code | Link modification operation code 11.3.19 | M | V | 1 |
| | QoS flow descriptions | PC5 QoS flow descriptions 11.3.5 | M | LV-E | 5-65537 |
| 7C | QoS rules | PC5 QoS rules 11.3.29 | O | TLV-E | 7-65538 |
| 66 | Source end UE info | Application layer ID 11.3.4 | O | TLV | 3-257 |
| 67 | Target end UE info | Application layer ID 11.3.4 | O | TLV | 3-257 |
| 2D | Target end UE layer-2 ID | Layer-2 ID 11.3.25 | O | TV | 4 |
| 33 | Source 5G ProSe layer-3 end UE MAC address | MAC address 11.3.45 | O | TLV | 8 |
| ~~9~~ | ~~Relay reselection indication~~ | ~~Relay reselection indication 11.3.46~~ | ~~O~~ | ~~TV~~ | ~~1~~ |
| 2F | List of candidates U2U relay UE info | List of user info ID 11.3.47 | O | TLV | 7-257 |
| 30 | Source end UE IP address | UE IP address 11.3.49 | O | TLV | 7-19 |
| 31 | List of target end UE IP addresses | List of UE IP addresses 11.3.n | O | TLV | 9-257 |
| 32 | List of candidates U2U relay UE layer-2 ID | List of candidates U2U relay UE layer-2 IDs 11.3.48 | O | TLV | 5-257 |
| 50 | New MSBs of $K_{NRP}$ ID | MSBs of $K_{NRP}$ ID 2 11.3.52 | O | TLV | 4 |

FIG. 18

Link modification operation code (octet 2)

Bits

4 3 2 1

| | | | | |
|---|---|---|---|---|
| 0 | 0 | 0 1 | | void |
| 0 | 0 | 1 0 | | void |
| 0 | 0 | 1 1 | | Add new PC5 QoS flow(s) to the existing 5G ProSe direct link |
| 0 | 1 | 0 0 | | Modify PC5 QoS parameters of the existing PC5 QoS flow(s) |
| 0 | 1 | 0 1 | | Remove existing PC5 QoS flow(s) from the existing 5G ProSe direct link |
| 0 | 1 | 1 0 | | Associate new ProSe application(s) with existing PC5 QoS flow(s) |
| 0 | 1 | 1 1 | | Remove ProSe application(s) from existing PC5 QoS flow(s) |
| 1 | 0 | 0 0 | | Add new 5G ProSe layer-3 end UE to the existing 5G ProSe direct link |
| 1 | 0 | 0 1 | | Remove 5G ProSe layer-3 end UE from the existing 5G ProSe direct link |
| 1 | 0 | 1 0 | | Add new 5G ProSe layer-2 end UE to the existing 5G ProSe direct link |
| 1 | 0 | 1 1 | | |
| | | to | | Spare |
| 1 | 1 | 1 0 | | |
| 1 | 1 | 1 1 | | ~~Reserved~~<u>Negotiated relay reselection</u> |

Bit 5 to 8 of octet 2 are spare and shall be coded as zero.

START

The source end UE sends a link modification request message for performing negotiated relay reselection, wherein the message including the information indicate that this message is for negotiated relay reselection

END

METHOD AND APPARATUS FOR SUPPORTING U2U RELAY COMMUNICATION VIA Layer-2 U2U RELAY IN A WIRELESS COMMUNICATION SYSTEM

CROSS-REFERENCE TO RELATED APPLICATIONS

The present Application claims the benefit of U.S. Provisional Patent Application Ser. No. 63/674,714 filed on Jul. 23, 2024, the entire disclosure of which is incorporated herein in its entirety by reference.

FIELD

This disclosure generally relates to wireless communication networks, and more particularly, to a method and apparatus for supporting U2U relay communication via Layer-2 U2U relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a first User Equipment (UE) are disclosed. In one embodiment, the first UE establishes a PC5 connection with a second UE for supporting a UE-to-UE (U2U) relay communication. The first UE also sends to the second UE a message to trigger a negotiated relay reselection, wherein the message includes a relay reselection indication information element (IE) and a link modification operation code IE set to a specific value.

BRIEF DESCRIPTION OF THE DRAWINGS

FIG. 11 is a reproduction of Figure 7.2.2.2.2 of 3GPP TS 24.554 V18.4.0.

FIG. 13 is a reproduction of Figure 7.2.3.2.2 of 3GPP TS 24.554 V18.4.0.

FIG. 14 is a reproduction of Table 10.3.6.1.1 of 3GPP TS 24.554 V18.4.0.

FIG. 15 is a reproduction of Figure 11.3.19.1 of 3GPP TS 24.554 V18.4.0.

FIG. 16 is a reproduction of Table 11.3.19.1 of 3GPP TS 24.554 V18.4.0.

FIG. 17 is a modified version of Table 11.3.19.13 of GPP TS 24.554 V18.4.0 according to one exemplary embodiment.

FIG. 18 is a modified version of Table 10.3.6.1.1 of 3GPP TS 24.554 V18.4.0 according to one exemplary embodiment.

FIG. 19 is another modified version of Table 11.3.19.1 of 3GPP TS 24.554 V18.4.0 according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V18.6.0, "Proximity based Services (ProSe) in the 5G System (5GS) (Release 18)"; and TS 24.554 V18.4.0, "Proximity-services (ProSe) in 5G System (5GS) protocol aspects; Stage 3 (Release 18)". The standards and documents listed above are hereby expressly incorporated by reference in their entirety.

Figure 1:
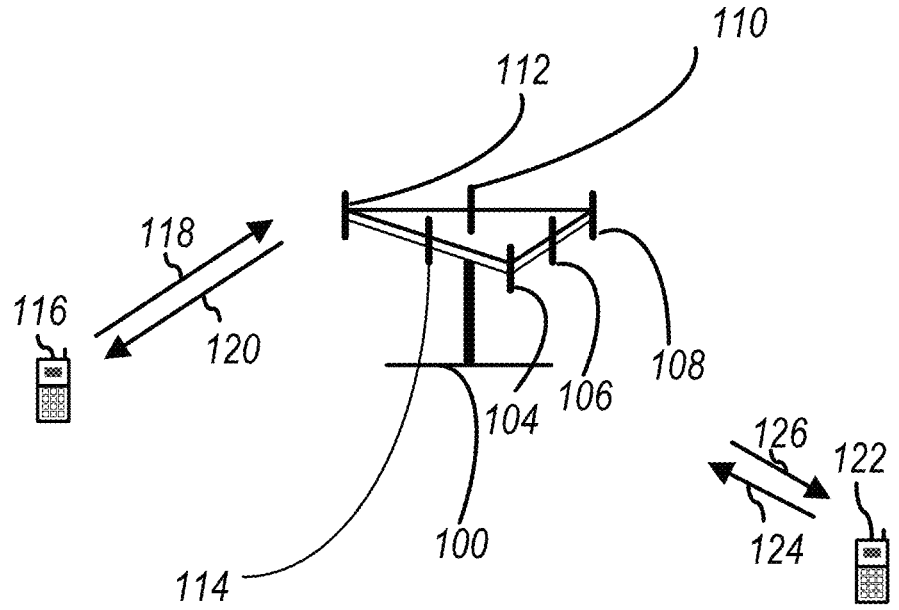
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
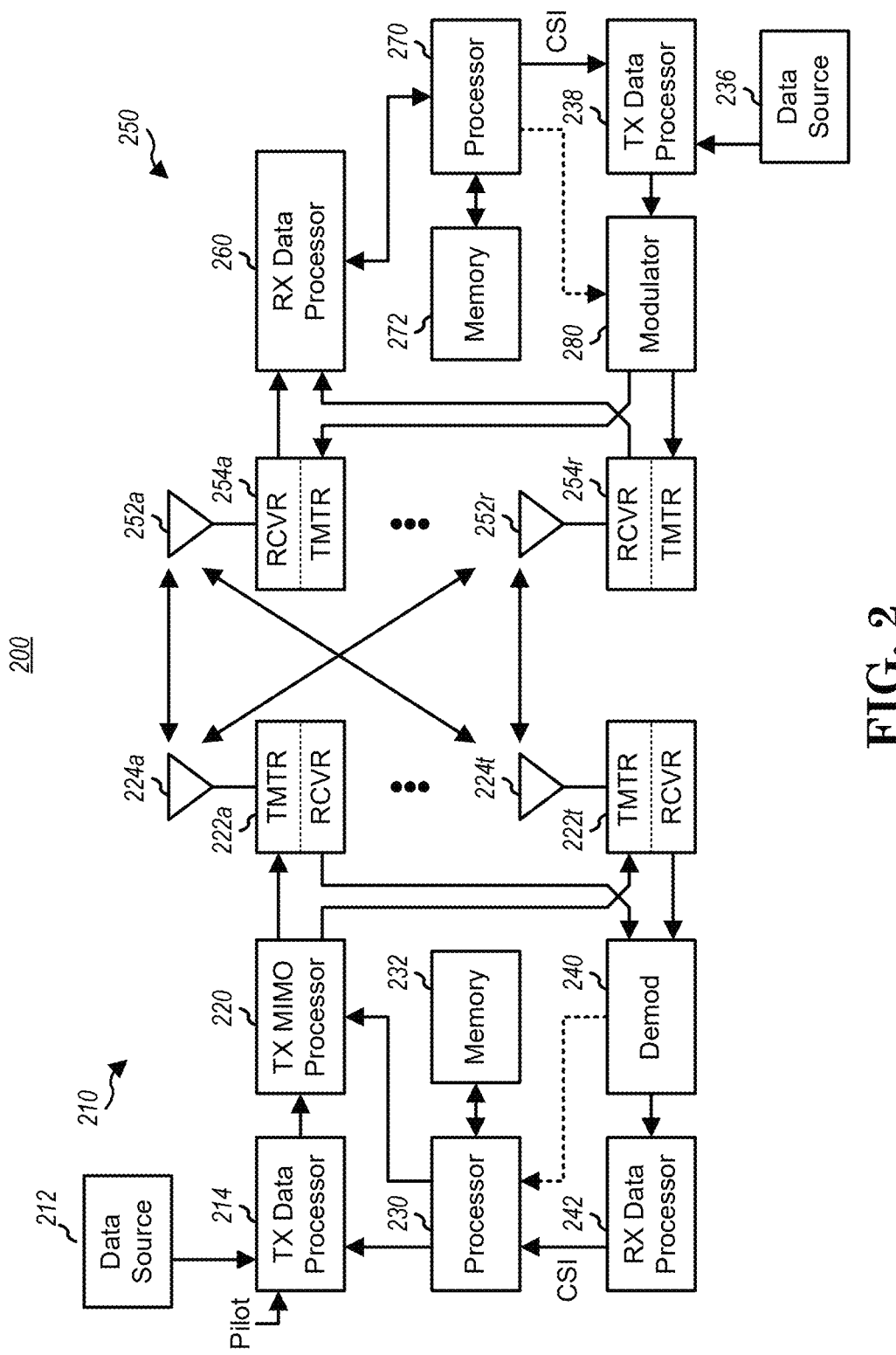
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
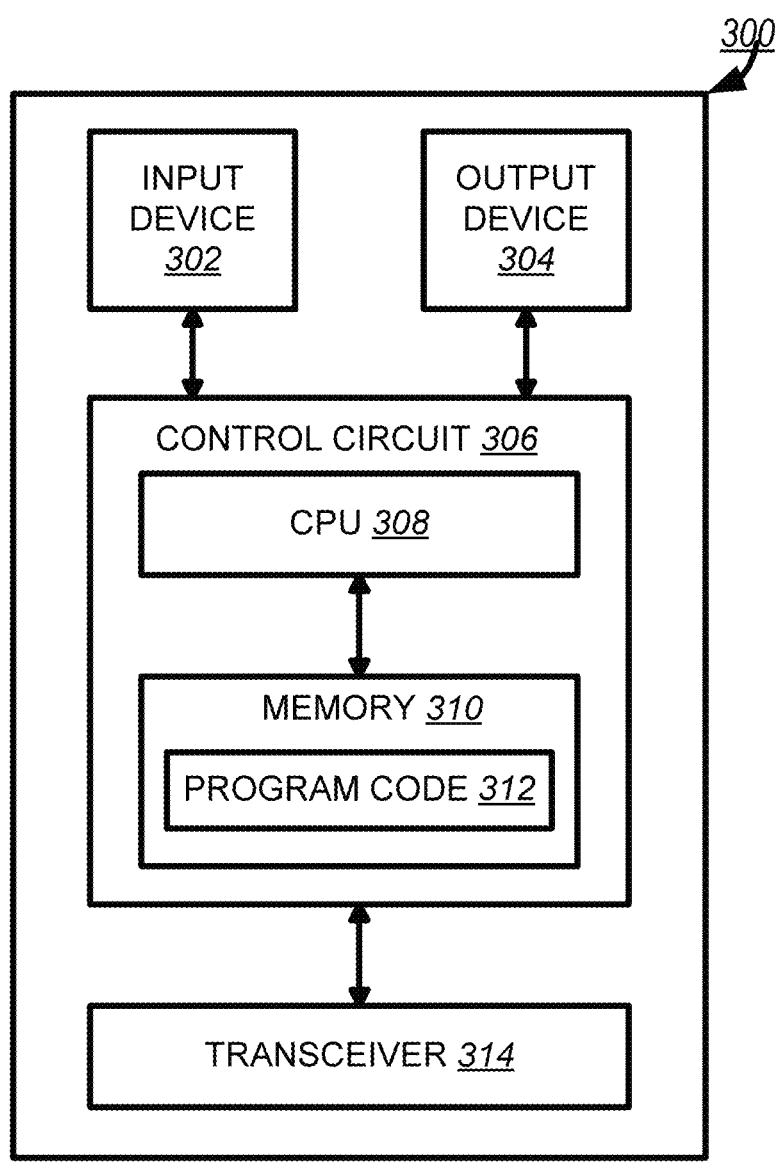
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
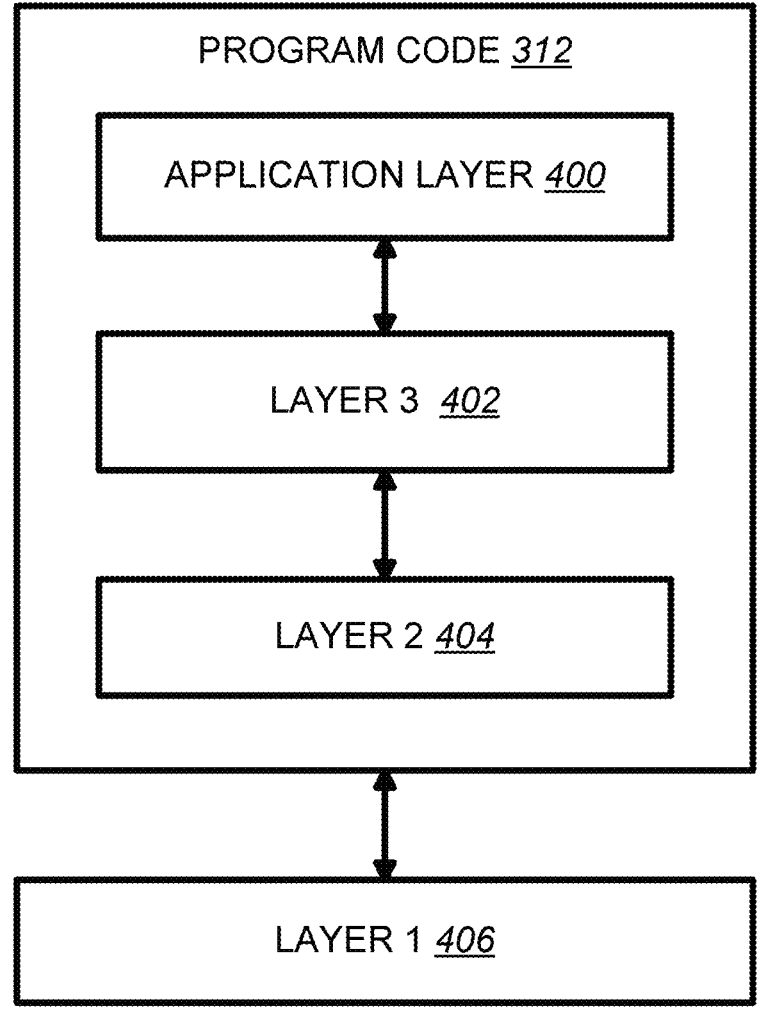
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following concepts:

4.2.8 5G ProSe UE-to-UE Relay Reference Architecture

Figure 4.2.8-1 shows the Layer-2 and Layer-3 5G ProSe UE-to-UE Relay reference architecture. The 5G ProSe End UEs communicate with each other via a 5G ProSe UE-to-UE Relay.

Figure 5:
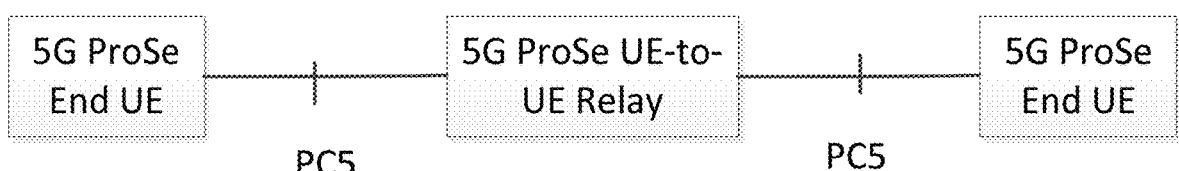
FIG. 5 is a reproduction of Figure 4.2.8-1 of 3GPP TS 23.304 V18.6.0.

> Figure 4.2.8-1 of 3GPP TS 23.304 V18.6.0,
> Entitled "Reference Architecture for 5G ProSe
> UE-to-UE Relay", is Reproduced as FIG. 5

Each 5G ProSe End UE and the 5G ProSe UE-to-UE Relay may have subscriptions from the same PLMN or different PLMNs.

[ . . . ]

6.4.3.7.1 Common Part for Layer-2 Link Management Over PC5 Reference Point for 5G ProSe UE-to-UE Relay For the 5G ProSe Communication via 5G ProSe UE-to-UE Relay as described in clause 6.7.1 and clause 6.7.2:

The Direct Communication Request message over the first hop PC5 reference point includes:

user info (i.e. Application Layer ID) of source 5G ProSe End UE: the identity of the source 5G ProSe End UE requesting relay operation.

User Info ID of 5G ProSe UE-to-UE Relay: the identity of the UE-to-UE Relay provided to the source 5G ProSe End UE during 5G ProSe UE-to-UE Relay Discovery procedure.

user info (i.e. Application Layer ID) of target 5G ProSe End UE: the identity of the target 5G ProSe End UE provided to the source 5G ProSe End UE during UE-to-UE Relay Discovery procedure.

(optional) Destination Layer-2 ID of target 5G ProSe End UE: the unicast destination Layer-2 ID of the target 5G ProSe End UE determined by the source 5G ProSe End UE as specified in clause 5.8.2.4.

ProSe Service Info: the information about the ProSe identifier(s) requesting Layer-2 link establishment.

RSC: the connectivity service provided by the 5G ProSe UE-to-UE Relay as requested by the source 5G ProSe End UE.

Security Information: the information for the establishment of security for the first hop PC5 link establishment (see TS 33.503 [29]).

The Direct Communication Request message over the second hop PC5 reference point includes:

user info (i.e. Application Layer ID) of source 5G ProSe End UE.

user info (i.e. Application Layer ID) of target 5G ProSe End UE.

User Info ID of 5G ProSe UE-to-UE Relay.

ProSe Service Info: the information about the ProSe identifier(s).

RSC: the connectivity service provided by the 5G ProSe UE-to-UE Relay as requested by the source 5G ProSe End UE.

Security Information: the information for the establishment of security for the second hop PC5 link establishment (see TS 33.503 [29]).

The Direct Communication Accept message over the second hop PC5 reference point includes:

user info (i.e. Application Layer ID) of target 5G ProSe End UE.

The Direct Communication Accept message over the first hop PC5 reference point includes:

user info (i.e. Application Layer ID) of target 5G ProSe End UE.

User Info ID of 5G ProSe UE-to-UE Relay.

The Link Modification Request message over the first hop PC5 reference point includes:

user info (i.e. Application Layer ID) of target 5G ProSe End UE: the identity of the target 5G ProSe End UE provided to the source 5G ProSe End UE during UE-to-UE Relay Discovery procedure.

(optional) Destination Layer-2 ID of target 5G ProSe End UE: the unicast destination Layer-2 ID of the target 5G ProSe End UE determined by the source 5G ProSe End UE as specified in clause 5.8.2.4.

The Link Modification Request message over the second hop PC5 reference point includes:

user info (i.e. Application Layer ID) of source 5G ProSe End UE.

user info (i.e. Application Layer ID) of target 5G ProSe End UE.

The Link Modification Accept message over the second hop PC5 reference point includes:

user info (i.e. Application Layer ID) of target 5G ProSe End UE.

The Link Modification Accept message over the first hop PC5 reference point includes:

user info (i.e. Application Layer ID) of target 5G ProSe End UE.

[ . . . ]

Figure 6:
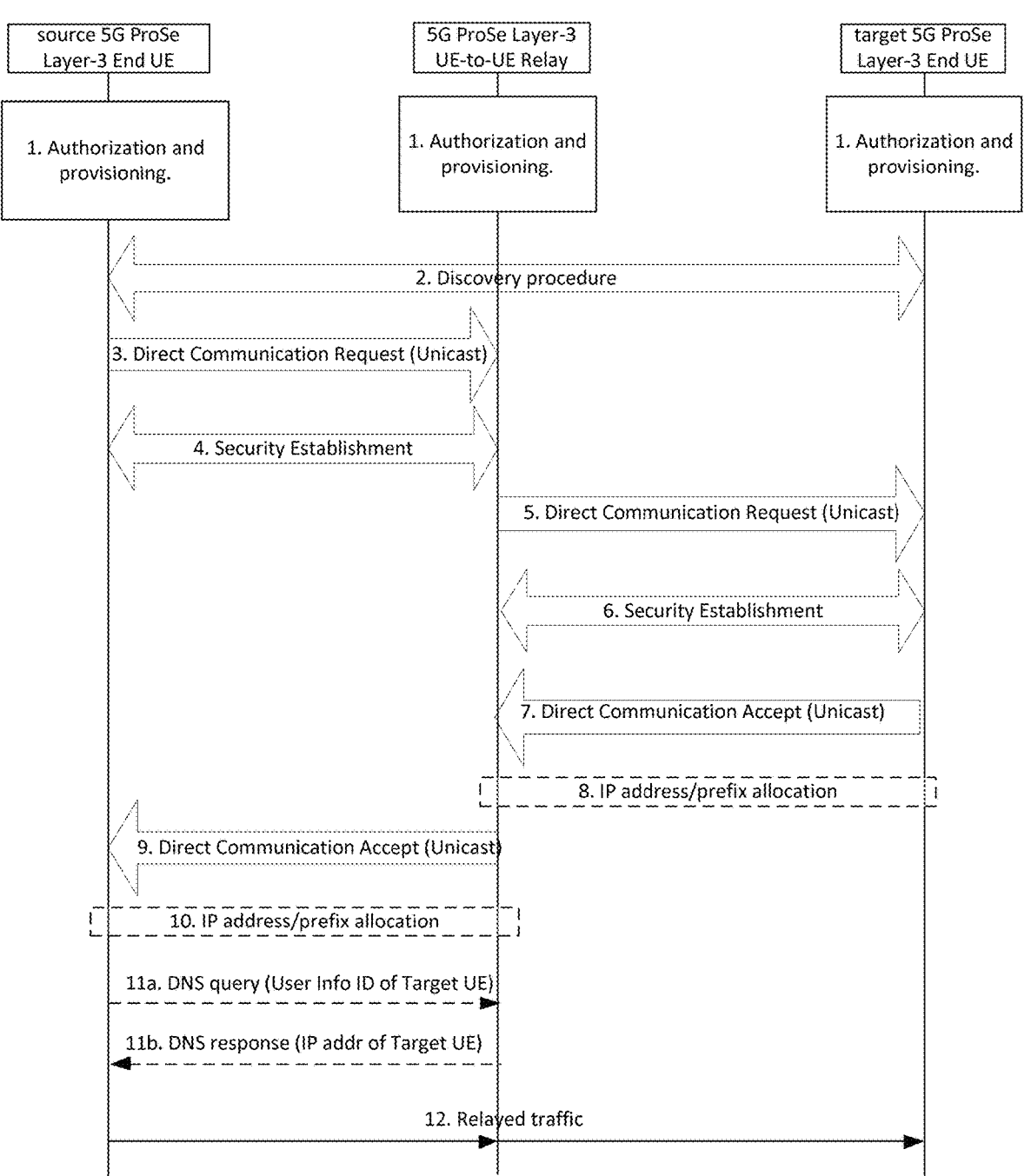
FIG. 6 is a reproduction of Figure 6.7.1.1-1 of 3GPP TS 23.304 V18.6.0.

6.7.1.1 Layer-2 Link Establishment for PC5 Communication Via 5G ProSe Layer-3 UE-to-UE Relay Figure 6.7.1.1-1 shows the procedure for Layer-2 link establishment via 5G ProSe Layer-3 UE-to-UE Relay.

> Figure 6.7.1.1-1 of 3GPP TS 23.304 V18.6.0,
> Entitled "Layer-2 Link Establishment Via 5G ProSe
> Layer-3 UE-to-UE Relay", is Reproduced as FIG. 6

1. Service authorization and provisioning are performed for source 5G ProSe Layer-3 End UE, target 5G ProSe Layer-3 End UE and 5G ProSe Layer-3 UE-to-UE Relay as described in clause 6.2.

2. The source 5G ProSe Layer-3 End UE performs discovery of a 5G ProSe Layer-3 UE-to-UE Relay as described in clause 6.3.2.4.

3. The source 5G ProSe Layer-3 End UE sends a Direct Communication Request message to initiate the unicast Layer-2 link establishment procedure with the 5G ProSe Layer-3 UE-to-UE Relay. The parameters included in the Direct Communication Request message are described in clause 6.4.3.7.

The Source Layer-2 ID of the Direct Communication Request message is self-assigned by the source 5G ProSe Layer-3 End UE and the Destination Layer-2

ID is set to the Source Layer-2 ID of the discovery message of the 5G ProSe Layer-3 UE-to-UE Relay.

The source 5G ProSe Layer-3 End UE gets application information and optional ProSe Application Requirements from ProSe application layer, and determines the end-to-end QoS parameters as described in clause 5.6.3.1.

4. If the User Info ID of 5G ProSe Layer-3 UE-to-UE Relay in the Direct Communication Request message matches the 5G ProSe UE-to-UE Relay's User Info ID and the RSC in the Direct Communication Request matches one RSC that the relay is (pre)configured with, as specified in clause 5.1.5.1, the 5G ProSe Layer-3 UE-to-UE Relay responds by establishing the security with the source 5G ProSe Layer-3 End UE. When the security protection is enabled, the source 5G ProSe Layer-3 End UE sends the parameters as described in clause 6.4.3.7 to the 5G ProSe Layer-3 UE-to-UE Relay.

If the Ethernet MAC address of source 5G ProSe Layer-3 End UE is already used by another 5G ProSe Layer-3 End UE, then the 5G ProSe Layer-3 UE-to-UE Relay rejects the direct link establishment indicating that the MAC address is not unique.

The Source Layer-2 ID used for the security establishment procedure is self-assigned by the 5G ProSe Layer-3 UE-to-UE Relay and the Destination Layer-2 ID is set to the Source Layer-2 ID of the received Direct Communication Request message.

The 5G ProSe Layer-3 UE-to-UE Relay shall choose different Source Layer-2 IDs for PC5 links of different types of traffic, i.e., IP traffic, Ethernet traffic and Unstructured traffic.

If the PC5 link is used for transferring Unstructured traffic, the 5G ProSe Layer-3 UE-to-UE Relay shall choose different Source Layer-2 IDs for different pair of source and target 5G ProSe Layer-3 End UEs.

Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.

5. After the Security Establishment procedure in step 4 is completed, the 5G ProSe Layer-3 UE-to-UE Relay decides whether to use an existing unicast Layer-2 link between itself and the target 5G ProSe End UE for the required service. If there is no existing unicast Layer-2 link of the required RSC with the target 5G ProSe Layer-3 End UE, the 5G ProSe Layer-3 UE-to-UE Relay sends a Direct Communication Request message to initiate the unicast Layer-2 link establishment procedure with the target 5G ProSe Layer-3 End UE. The parameters included in the Direct Communication Request message are described in clause 6.4.3.7.

The Source Layer-2 ID of the Direct Communication Request message is self-assigned by the 5G ProSe Layer-3 UE-to-UE Relay and the Destination Layer-2 ID may be broadcast or unicast Layer-2 ID. Unicast Layer-2 ID is used only if the Layer-2 ID of the target 5G ProSe Layer-3 End UE associated with the User Info ID is known to the 5G ProSe Layer-3 UE-to-UE Relay.

The 5G ProSe Layer-3 UE-to-UE Relay shall choose different Source Layer-2 IDs for PC5 links of different types of traffic, i.e., IP traffic, Ethernet traffic and Unstructured traffic.

If the PC5 link is used for transferring Unstructured traffic, the 5G ProSe Layer-3 UE-to-UE Relay shall choose different Source Layer-2 IDs for different pair of source and target 5G ProSe Layer-3 End UEs.

6. If the User Info ID of target 5G ProSe Layer-3 End UE and RSC included in the Direct Communication Request match the target UE's User Info ID and the RSC that the target UE is (pre)configured with as specified in clause 5.1.5.1, the target 5G ProSe Layer-3 End UE responds by establishing the security with the 5G ProSe Layer-3 UE-to-UE Relay. When the security protection is enabled, the 5G ProSe Layer-3 UE-to-UE Relay sends the parameters as described in clause 6.4.3.7 to the target 5G ProSe Layer-3 End UE.

The Source Layer-2 ID used for the security establishment procedure is self-assigned by the target 5G ProSe Layer-3 End UE and the Destination Layer-2 ID is set to the Source Layer-2 ID of the received Direct Communication Request message.

Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.

7. The target 5G ProSe Layer-3 End UE sends a Direct Communication Accept message to the 5G ProSe Layer-3 UE-to-UE Relay that has successfully established security with. The parameters included in the Direct Communication Accept message are described in clause 6.4.3.7.

NOTE: The 5G ProSe Layer-3 UE-to-UE Relay can detect that the Ethernet MAC address of target 5G ProSe Layer-3 End UE is already used by another 5G ProSe Layer-3 End UE when it receives the Direct Communication Accept message.

8. For IP traffic, IPv6 prefix or IPv4 address is allocated for the target 5G ProSe Layer-3 End UE as defined in clause 5.5.1.4.

9. After receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with. The parameters included in the Direct Communication Accept message are described in clause 6.4.3.7.

10. For IP traffic, IPv6 prefix or IPv4 address is allocated for the source 5G ProSe Layer-3 End UE as defined in clause 5.5.1.4.

11. For IP communication, the 5G ProSe Layer-3 UE-to-UE Relay may store an association of User Info ID and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 10 if the IP address of target 5G ProSe Layer-3 End UE is not received in step 9 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay maintains the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

12. The source 5G ProSe Layer-3 End UE communicates with the target 5G ProSe Layer-3 End UE via the 5G ProSe Layer-3 UE-to-UE Relay.

[ . . . ]

6.7.2 5G ProSe Communication Via 5G ProSe Layer-2 UE-to-UE Relay

This procedure applies to 5G ProSe Layer-2 UE-to-UE Relay.

Figure 7:
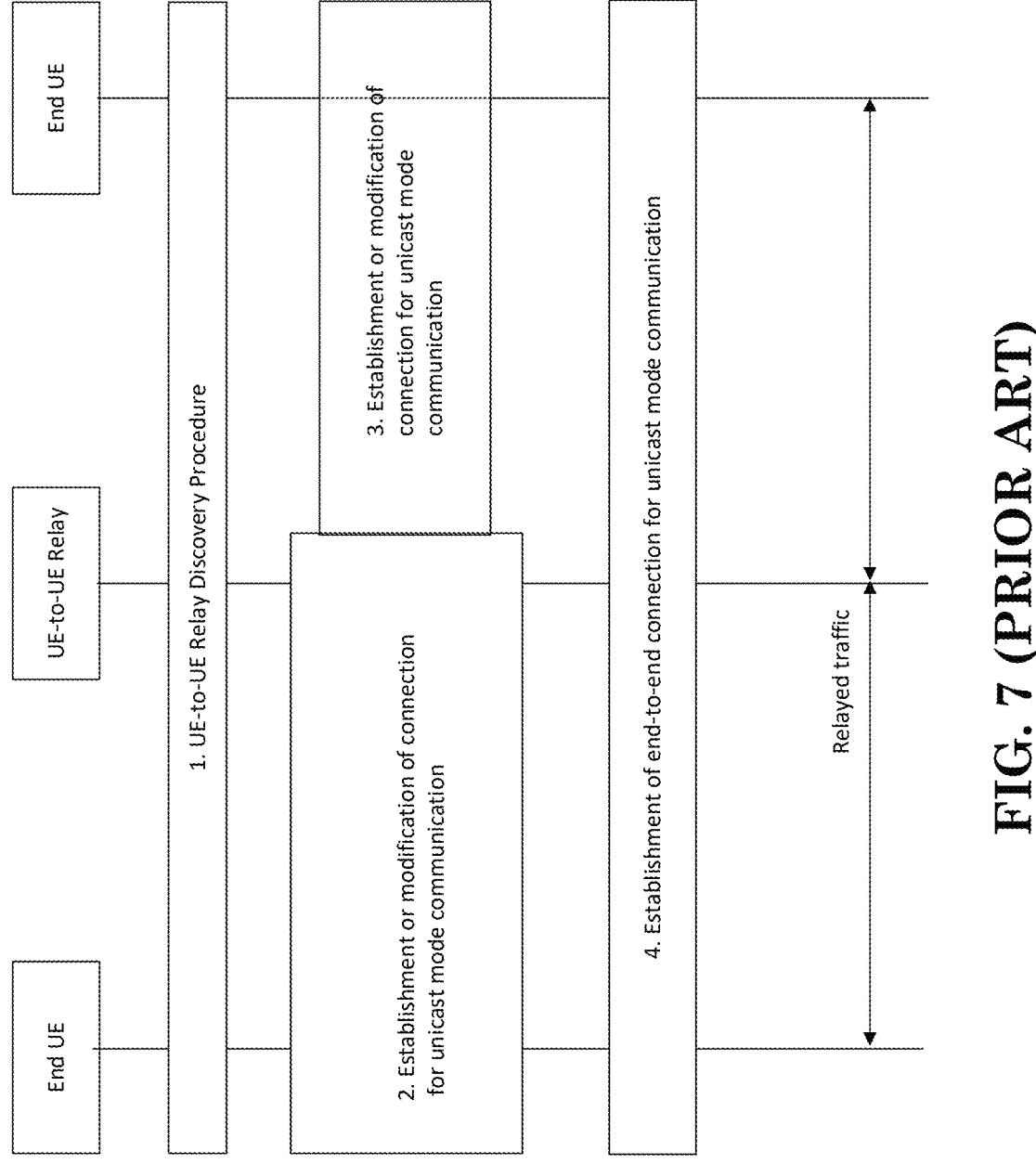
FIG. 7 is a reproduction of Figure 6.7.1.1-1 of 3GPP TS 23.304 V18.6.0.

Figure 6.7.2-1 of 3GPP TS 23.304 V18.6.0, Entitled "5G ProSe Communication Via 5G ProSe Layer-2 UE-to-UE Relay", is Reproduced as FIG. 7

Service authorization and provisioning has been performed for the 5G ProSe Layer-2 UE-to-UE Relay and the 5G ProSe End UEs as described in clause 6.2 before this procedure.

1. Model A or Model B 5G ProSe UE-to-UE Relay Discovery as described in clause 6.3.2.4 is performed and a source 5G ProSe End UE selects a suitable 5G ProSe Layer-2 UE-to-UE Relay for the communication with a target 5G ProSe End UE.

2. The source 5G ProSe End UE decides whether to use an existing PC5 link with the 5G ProSe UE-to-UE Relay for the required service. If an existing PC5 link is used then the Layer-2 link modification procedure as specified in clause 6.4.3.7 is used towards a 5G ProSe UE-to-UE Relay, otherwise a Layer-2 link establishment procedure is used towards a 5G ProSe UE-to-UE Relay.

This procedure is towards the selected 5G ProSe UE-to-UE Relay and for Layer-2 link establishment, the security establishment is performed before step 3 is initiated.

NOTE: The source 5G ProSe Layer-2 End UE does not initiate any Layer-2 link establishment or Layer-2 link modification procedure towards the same 5G ProSe Layer-2 UE-to-UE Relay for a different target 5G ProSe Layer-2 End UE unless the current Layer-2 link establishment or Layer-2 link modification procedure has been completed including reception of the PC5-RRC message from the 5G ProSe Layer-2 UE-to-UE Relay as specified in TS 38.300 [12]. Therefore, the source 5G ProSe Layer-2 End UE can recognize the target 5G ProSe Layer-2 End UE of the Layer-2 ID provided by the 5G ProSe Layer-2 UE-to-UE Relay.

3. The 5G ProSe Layer-2 UE-to-UE Relay decides whether to use an existing PC5 link between the 5G ProSe UE-to-UE Relay and the target 5G ProSe End UE for the required service and initiates Layer-2 link establishment procedure or Layer-2 link modification procedure as specified in clause 6.4.3.7 with the target 5G ProSe End UE.

If the Layer-2 link establishment procedure is performed towards the target 5G ProSe End UE then either a broadcast or a unicast Layer-2 ID is used as the Destination Layer-2 ID. A Unicast Layer-2 ID is used if the Layer-2 ID of the target 5G ProSe Layer-2 End UE associated with the user info (i.e. Application Layer ID) of target 5G ProSe Layer-2 End UE is known to the 5G ProSe Layer-2 UE-to-UE Relay.

If the Layer-2 link modification procedure is performed towards the target 5G ProSe End UE, it uses the unicast Layer-2 ID of target 5G ProSe End UE as the Destination Layer-2 ID.

The 5G ProSe Layer-2 UE-to-UE Relay sends a Direct Communication Accept message or Link Modification Accept message to the source 5G ProSe End UE after step 3 is completed.

4. The source 5G ProSe End UE establishes an end-to-end connection for unicast mode communication with the target 5G ProSe End UE as described in clause 6.4.3.7.

The data and End-to-End PC5-S signalling are transferred between the source 5G ProSe End UE and the target 5G ProSe End UE via the 5G ProSe Layer-2 UE-to-UE Relay. The 5G ProSe Layer-2 UE-to-UE Relay forwards all the data traffic and End-to-End PC5-S signalling between the source 5G ProSe End UE and the target 5G ProSe End UE, as specified in TS 38.300 [12].

[ . . . ]

6.7.4 5G ProSe UE-to-UE Relay Reselection 6.7.4.1 General

After being connected to the 5G ProSe UE-to-UE Relay, the 5G ProSe End UEs may trigger the 5G ProSe UE-to-UE Relay reselection based on conditions (e.g. the measured signal strength of PC5 unicast link with the 5G ProSe UE-to-UE Relay) as specified in TS 38.300 [12]. For 5G ProSe UE-to-UE Relay reselection, a 5G ProSe UE-to-UE Relay may be discovered by either the discovery procedures defined in clause 6.3.2.4 or by the negotiated 5G ProSe UE-to-UE Relay reselection procedure defined in clause 6.7.4.2 or clause 6.7.4.3.

In the negotiated UE-to-UE Relay reselection defined in clause 6.7.4.2 or clause 6.7.4.3, one 5G ProSe End UE initiates the UE-to-UE Relay reselection procedure, the 5G ProSe End UEs can negotiate a new 5G ProSe UE-to-UE Relay using the existing connection and to establish the communication via the reselected 5G ProSe UE-to-UE Relay prior to releasing the communication via the current 5G ProSe UE-to-UE Relay.

6.7.4.2 Negotiated 5G ProSe Layer-2 UE-to-UE Relay Reselection

Depicted in Figure 6.7.4.2-1 is the procedure for the negotiated 5G ProSe Layer-2 UE-to-UE Relay reselection.

Figure 8:
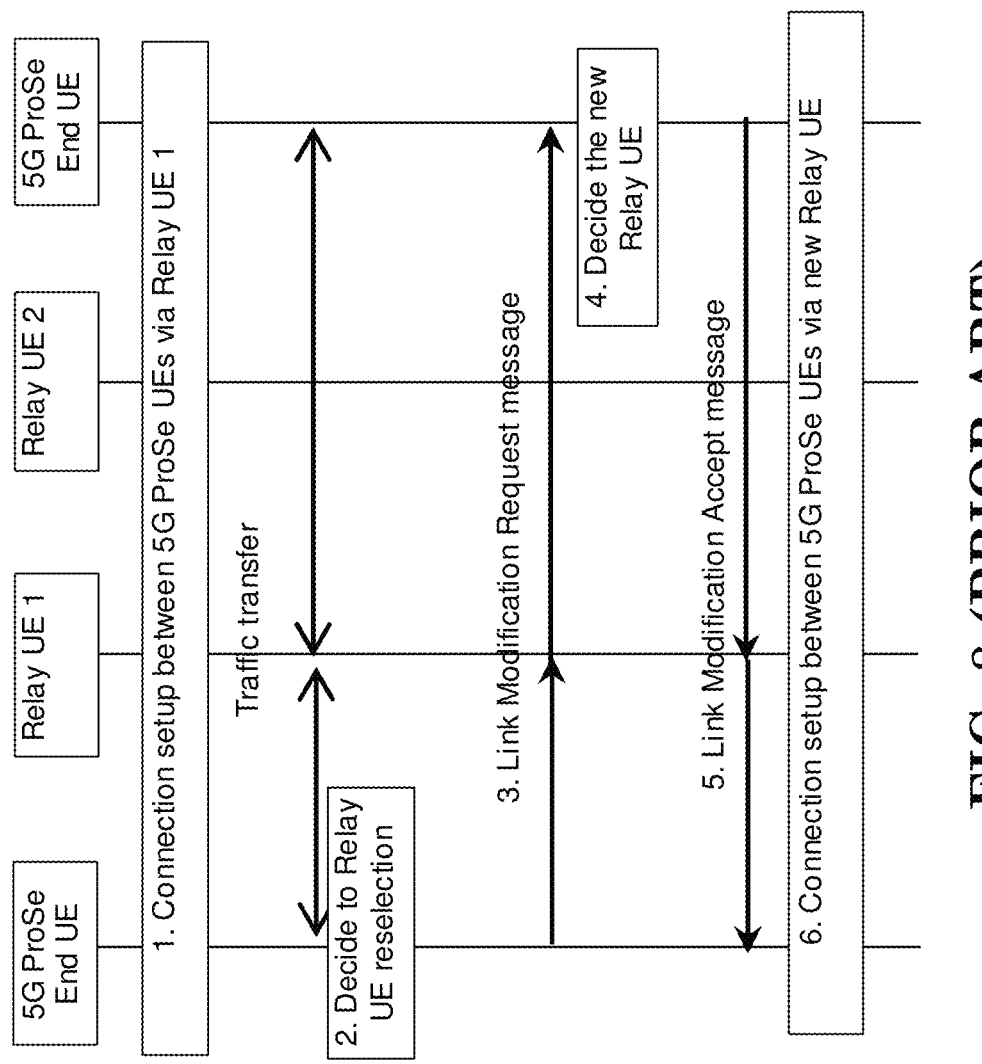
FIG. 8 is a reproduction of Figure 6.7.4.2-1 of 3GPP TS 23.304 V18.6.0.

Figure 6.7.4.2-1 of 3GPP TS 23.304 V18.6.0, Entitled "Negotiated 5G ProSe Layer-2 UE-to-UE Relay Reselection", is Reproduced as FIG. 8

1. A PC5 unicast link is established between the 5G ProSe End UEs via a 5G ProSe UE-to-UE Relay, based on the procedure defined in clause 6.7.2.

2. The initiating 5G ProSe End UE determines, e.g. based on PC5 signal strength, to perform UE-to-UE Relay reselection and obtains a list of candidate UE-to-UE Relays per RSC. The initiating 5G ProSe End UE may receive UE-to-UE Relay Discovery Announcement messages from 5G ProSe UE-to-UE Relays or initiate the 5G ProSe UE-to-UE Relay discovery procedures to find the candidate 5G ProSe UE-to-UE Relays. The initiating 5G ProSe End UE determines the candidate 5G ProSe UE-to-UE Relays e.g., based on the PC5 signal strength of the received UE-to-UE Relay Discovery Announcement message, RSC within the UE-to-UE Relay Discovery Announcement message. The candidate 5G ProSe UE-to-UE Relays support the same RSC which is associated with the PC5 unicast link between the initiating 5G ProSe End UE and the 5G ProSe UE-to-UE Relay.

3. The initiating 5G ProSe End UE sends a Link Modification Request message to the responding 5G ProSe End UE which includes a Relay re-selection indication, the User Info ID(s) of the candidate 5G ProSe UE-to-UE Relay(s) and optionally the Layer-2 ID(s) of the candidate 5G ProSe UE-to-UE Relay(s) and security information.

4. The responding 5G ProSe End UE selects a new 5G ProSe UE-to-UE Relay from the candidate 5G ProSe UE-to-UE Relays per RSC, based on the Relay re-selection indication in the Link Modification Request message. If the responding 5G ProSe End UE has not received a UE-to-UE Relay Discovery Announcement message from a candidate 5G ProSe UE-to-UE Relay (e.g. during a previous 5G ProSe UE-to-UE Relay Discovery procedure) or does not have a PC5 connection with the candidate 5G ProSe UE-to-UE Relay associated with the same RSC, then the responding 5G ProSe End UE may perform the Candidate 5G ProSe UE-to-UE Relay Discovery procedure defined in clause 6.3.2.4.4. The responding 5G ProSe End UE sets the candidate relay User Info ID to that of a candidate 5G ProSe UE-to-UE Relay in the discovery message and may set the Layer-2 ID of the candidate 5G ProSe UE-to-UE Relay, if received at step 3, as the Destination Layer-2 ID to carry the discovery message. The PC5 signal strength of the UE-to-UE Relay Discovery Announcement message or UE-to-UE Relay Discovery Response message may be used to select the new 5G ProSe UE-to-UE Relay.

5. The responding 5G ProSe End UE sends a Link Modification Accept message to the initiating 5G ProSe End UE, including the User Info ID of the new 5G ProSe UE-to-UE Relay and security information.

6. 5G ProSe End UEs set up PC5 unicast links, if not already set up, with the new 5G ProSe UE-to-UE Relay, by reusing the procedure defined in clause 6.7.2 and the PC5 unicast is link established between 5G ProSe End UEs via the new 5G ProSe UE-to-UE Relay. The 5G ProSe End UEs switch the data traffic via the new 5G ProSe UE-to-UE Relay. The security information is used to verify that the new link has been set up successfully.

NOTE 1: The security information contents and usage will be defined by SA WG3.

NOTE 2: Whether a 5G ProSe End UE releases a PC5 unicast link with the original 5G ProSe UE-to-UE Relay after reselection depends on whether the PC5 unicast link is still required and UE implementation.

6.7.4.3 Negotiated 5G ProSe Layer-3 UE-to-UE Relay Reselection

Depicted in Figure 6.7.4.3-1 is the procedure for the negotiated 5G ProSe Layer-3 UE-to-UE Relay reselection.

Figure 9:
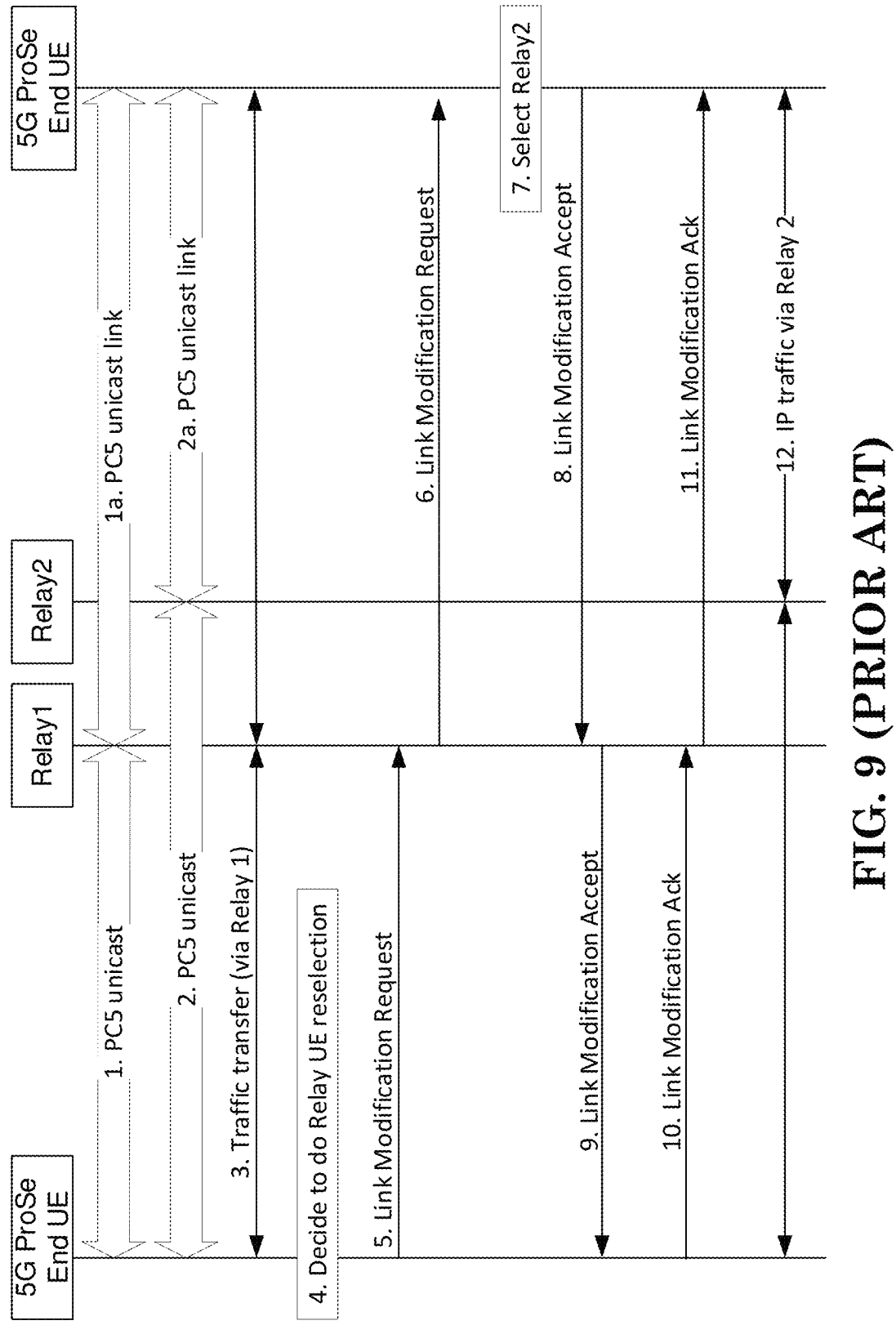
FIG. 9 is a reproduction of Figure 6.7.4.3-1 of 3GPP TS 23.304 V18.6.0.

Figure 6.7.4.3-1 of 3GPP TS 23.304 V18.6.0, Entitled "Negotiated 5G ProSe Layer-3 UE-to-UE Relay Reselection", is Reproduced as FIG. 9

1. 5G ProSe End UEs have set up PC5 unicast links with a 5G ProSe UE-to-UE Relay, based on the procedure defined in clause 6.7.1.

2. The 5G ProSe End UEs have additionally set up PC5 unicast links with a 5G ProSe UE-to-UE Relay, based on the procedure defined in clause 6.7.1.

3. The 5G ProSe End UEs are transferring traffic via the 5G ProSe UE-to-UE Relay.

4. The initiating 5G ProSe End UE determines, e.g. based on PC5 signal strength, to perform UE-to-UE Relay reselection and obtains a list of candidate UE-to-UE Relays per RSC. The initiating 5G ProSe End UE may receive UE-to-UE Relay Discovery Announcement messages from 5G ProSe UE-to-UE Relays or initiate the 5G ProSe UE-to-UE Relay discovery procedures to find the candidate 5G ProSe UE-to-UE Relays. The initiating 5G ProSe End UE determines the candidate 5G ProSe UE-to-UE Relays e.g., based on the PC5 signal strength of the received UE-to-UE Relay Discovery Announcement message, RSC within the UE-to-UE Relay Discovery Announcement message. The candidate 5G ProSe UE-to-UE Relays support the same RSC which is associated with the PC5 unicast link between the initiating 5G ProSe End UE and the 5G ProSe UE-to-UE Relay.

5. The initiating 5G ProSe End UE sends a Link Modification Request message to the responding 5G ProSe UE-to-UE Relay, which includes a Relay re-selection indication, the User Info ID(s) of the candidate 5G ProSe UE-to-UE Relay(s), the IP addresses of the responding 5G ProSe End UEs and optionally the Layer-2 ID(s) of the candidate 5G ProSe UE-to-UE Relay(s).

Multiple 5G ProSe End UEs IP addresses may be included when the initiating 5G ProSe End UE is communicating with multiple 5G ProSe End UEs via the 5G ProSe UE-to-UE Relay.

6. 5G ProSe UE-to-UE Relay determines the responding 5G ProSe End UE based on the IP address received from the initiating 5G ProSe End UE and sends a Link Modification Request message to the responding 5G ProSe End UE. The Link Modification Request message includes a Relay re-selection indication, User Info ID(s) of the candidate 5G ProSe UE-to-UE Relay(s), IP address of the initiating 5G ProSe End UE and optionally the Layer-2 ID(s) of the candidate 5G ProSe UE-to-UE Relay(s).

If multiple 5G ProSe End UEs are specified in the Link Modification Request message received from the initiating 5G ProSe End UE, the 5G ProSe UE-to-UE Relay sends a PC5 Link Modification Request to each of the 5G ProSe End UEs.

7. The responding 5G ProSe End UE selects a new 5G ProSe UE-to-UE Relay from the candidate 5G ProSe UE-to-UE Relays per RSC, based on the Relay re-selection indication in the Link Modification Request message. If the responding 5G ProSe End UE has not received a UE-to-UE Relay Discovery Announcement message from a candidate 5G ProSe UE-to-UE Relay (e.g. during a previous 5G ProSe UE-to-UE Relay Discovery procedure) or does not have a PC5 connection with the candidate 5G ProSe UE-to-UE Relay associated with the same RSC, then the responding 5G ProSe End UE may perform the Candidate 5G ProSe UE-to-UE Relay Discovery procedure defined in clause 6.3.2.4.4. The responding 5G ProSe End UE sets the candidate relay User Info ID to that of a candidate 5G ProSe UE-to-UE Relay in the discovery message and may set the Layer-2 ID of the candidate 5G ProSe UE-to-UE Relay, if received at step 6, as the Destination Layer-2 ID to carry the discovery message. The responding 5G ProSe End UE may initiate the procedure to set up PC5 unicast links with the new 5G ProSe UE-to-UE Relay, by reusing the procedure defined in clause 6.7.1. The PC5 signal strength of the UE-to-UE Relay Discovery Announcement message or UE-to-UE Relay Discovery Response message may be used to select the new 5G ProSe UE-to-UE Relay.

8. The responding 5G ProSe End UE sends a Link Modification Accept message to the 5G ProSe UE-to-UE Relay, including the User Info ID of the new 5G ProSe UE-to-UE Relay, IP address of the initiating 5G ProSe End UE, IP address of the responding 5G ProSe End UE for communication via the newly selected 5G ProSe UE-to-UE Relay and Relay re-selection indication.

9. 5G ProSe UE-to-UE Relay sends a Link Modification Accept message to the initiating 5G ProSe End UE, including the User Info ID of the new 5G ProSe UE-to-UE Relay, IP address of the responding 5G ProSe End UE, IP address of the responding 5G ProSe End UE for communication via the newly selected 5G ProSe UE-to-UE Relay and Relay re-selection indication.

10-11. Link Modification Ack is sent from the initiating 5G ProSe End UE to the responding the 5G ProSe End UE via the 5G ProSE UE-to-UE Relay, including the IP address of the initiating 5G ProSe End UE for communication via the newly selected 5G ProSe UE-to-UE Relay, the IP address of the responding 5G ProSe End UE and Relay re-selection indication.

12. The 5G ProSe End UEs transfer traffic via the newly selected 5G ProSe UE-to-UE Relay.

NOTE: Whether a 5G ProSe End UE releases a PC5 unicast link with the original 5G ProSe UE-to-UE Relay after reselection depends on whether the PC5 unicast link is still required and UE implementation.

3GPP TS 24.554 introduced the following concepts:
7.2.2 5G ProSe Direct Link Establishment Procedure
7.2.2.1 General Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G direct link between two UEs or to establish multiple 5G ProSe direct links between the UE and multiple target UEs. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE 1: The recommended maximum number of established 5G ProSe direct links is 8. When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay shall perform the remote UE report procedure as specified in 3GPP TS 24.501 [11].

NOTE 2: A single PC5 unicast link is established between a 5G ProSe layer-2 UE-to-network relay UE and a 5G ProSe layer-2 remote UE for supporting PDU sessions of the 5G ProSe layer-2 remote UE, as specified in 3GPP TS 38.300 [21].
7.2.2.2 5G ProSe Direct Link Establishment Procedure Initiation by Initiating UE The initiating UE shall meet the following pre-conditions before initiating this procedure:
a) the UE receives
1) a request from upper layers to transmit the packet for ProSe application over PC5;
2) a request from lower layers to trigger 5G ProSe direct link establishment;
3) a PROSE DIRECT LINK ESTABLISHMENT REQUEST message in case of 5G ProSe UE-to-UE relay, to trigger 5G ProSe direct link establishment; or
4) a PROSE DIRECT LINK MODIFICATION REQUEST message in case of 5G ProSe UE-to-UE relay, to trigger 5G ProSe direct link establishment;
b) the communication mode is unicast mode (e.g., pre-configured as specified in clause 5.2.4 or indicated by upper layers);
c) the link layer identifier for the initiating UE (i.e., layer-2 ID used for unicast communication) is available (e.g., pre-configured or self-assigned) and is not being used by other existing 5G ProSe direct links within the initiating UE;
d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);
NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.
e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, is authorized to use a 5G ProSe UE-to-network relay UE, is authorized to use a 5G ProSe UE-to-UE relay UE or is authorized to act as a 5G ProSe UE-to-UE relay UE. The UE considers that it is not served by NG-RAN if the following conditions are met:
1) not served by NG-RAN for ProSe direct communication over PC5;
2) in limited service state as specified in 3GPP TS 23.122 [14], if the reason for the UE being in limited service state is one of the following;
i) the UE is unable to find a suitable cell in the selected PLMN as specified in 3GPP TS 38.304 [15];
ii) the UE received a REGISTRATION REJECT message or a SERVICE REJECT message with the 5GMM cause #11 "PLMN not allowed" as specified in 3GPP TS 24.501 [11];
iii) the UE received a REGISTRATION REJECT message or a SERVICE REJECT message with the 5GMM cause #7 "5GS services not allowed" as specified in 3GPP TS 24.501 [11]; or
iv) the UE does not have a valid USIM, the 5G ProSe direct link establishment procedure is for direct communication between the 5G ProSe remote UE and the 5G ProSe UE-to-network relay UE, and the RSC is specific for emergency services; or 3) in limited service state as specified in 3GPP TS 23.122 [14] for reasons other than i), ii), iii) or iv) above and located in a geographical area for which the UE is provisioned with "non-operator managed" radio parameters as specified in clause 5.2;

f) there is no existing 5G ProSe direct link for the pair of peer application layer IDs, or there is an existing 5G ProSe direct link for the pair of peer application layer IDs and:

1) the network layer protocol of the existing 5G ProSe direct link is not identical to the network layer protocol required by the upper layer in the initiating UE for this ProSe application;

2) the security policy (either signalling security policy or user plane security policy) corresponding to the ProSe identifier is not compatible with the security policy of the existing 5G ProSe direct link; or 3) in case of the 5G ProSe direct link establishment procedure is for direct communication between the 5G ProSe layer-3 remote UE and the 5G ProSe layer-3 UE-to-network relay UE, the existing 5G ProSe direct link for the peer UE is established with a different RSC or established not for direct communication between the 5G ProSe layer-3 remote UE and the 5G ProSe layer-3 UE-to-network relay UE;

4) in case of the 5G ProSe direct link establishment procedure is for direct communication between the 5G ProSe layer-2 remote UE and the 5G ProSe layer-2 UE-to-network relay UE, the existing 5G ProSe direct link for the peer UE is established not for direct communication between the 5G ProSe layer-2 remote UE and the 5G ProSe layer-2 UE-to-network relay UE;

5) in case of the 5G ProSe direct link establishment procedure is for direct communication between the source 5G ProSe layer-3 end UE and the 5G ProSe layer-3 UE-to-UE relay UE, the initiating UE acts as the source 5G ProSe end UE, the existing 5G ProSe direct link for the peer UE is established with a different RSC or established not for direct communication between the source 5G ProSe layer-3 end UE and the 5G ProSe layer-3 UE-to-UE relay UE;

6) in case of the 5G ProSe direct link establishment procedure is for direct communication between the 5G ProSe UE-to-UE relay UE and the target 5G ProSe end UE without integrated discovery, the initiating UE acts as the 5G ProSe UE-to-UE relay UE, the 5G ProSe direct link security mode control procedure between the source 5G ProSe end UE and the initiating UE has been successfully completed, and there is no 5G ProSe direct link established between the initiating UE and the target 5G ProSe end UE with the RSC received in PROSE DIRECT LINK ESTABLISHMENT REQUEST message for 5G ProSe UE-to-UE relay;

7) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK ESTABLISHMENT REQUEST message including the relay indication, and there is no 5G ProSe direct link established between the initiating UE and the target 5G ProSe end UE with the RSC received in PROSE DIRECT LINK ESTABLISHMENT REQUEST message for 5G ProSe UE-to-UE relay; or 8) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK MODIFICATION REQUEST message to establish 5G ProSe UE-to-UE relay communication with an additional 5G ProSe layer-3 end UE as specified in clause 7.2.3.2, and there is no 5G ProSe direct link established between the initiating UE and the additional target 5G ProSe end UE with the RSC received in PROSE DIRECT LINK MODIFICATION REQUEST message for 5G ProSe UE-to-UE relay;

g) the number of established 5G ProSe direct links is less than the implementation-specific maximum number of established 5G ProSe direct links allowed in the UE at a time; and h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK used for UE-to-network relay discovery along with the UTC-based counter for encrypting:

a) the relay service code; and b) the UP-PRUK ID or CP-PRUK ID, if available, as specified in clause 6.3.5.2 of 3GPP TS 33.503 [34], and the UE shall use the security protected relay service code and the security protected UP-PRUK ID or security protected CP-PRUK ID for creating a PROSE DIRECT LINK ESTABLISHMENT REQUEST message.

NOTE 2: If the UE is neither configured with DUCK nor DUSK, the relay service code and the UP-PRUK ID or CP-PRUK ID are not encrypted.

If the 5G ProSe direct link establishment procedure is for direct communication between the 5G ProSe end UE and the 5G ProSe UE-to-UE relay UE, then the UE shall apply the DUCK or DUSK associated with the relay service code along with the UTC-based counter for encrypting:

a) the relay service code; and b) the UP-PRUK ID or CP-PRUK ID, if available and the UE does not act as a 5G ProSe UE-to-UE relay UE, as specified in clause 6.3.5.2 of 3GPP TS 33.503 [34], and the UE shall use the security protected relay service code and, if available and the UE does not act as a 5G ProSe UE-to-UE relay UE, the security protected UP-PRUK ID or security protected CP-PRUK ID for creating a PROSE DIRECT LINK ESTABLISHMENT REQUEST message.

NOTE 2A: If the UE is neither configured with DUCK nor DUSK, the relay service code and the UP-PRUK ID or CP-PRUK ID are not encrypted.

If the 5G ProSe direct link establishment procedure is for ProSe identifier of ranging and sidelink positioning, then the UE shall apply the DUCK or DUSK used for ranging and sidelink positioning UE discovery along with the UTC-based counter for encrypting:

a) the ProSe identifier of ranging and sidelink positioning; and b) the SLPK ID, if available, as specified in 3GPP TS 33.533 [55], and the UE shall use the security protected ProSe identifier of ranging and sidelink positioning and the security protected SLPK ID for creating a PROSE DIRECT LINK ESTABLISHMENT REQUEST message.

NOTE 2B: If the UE is neither configured with DUCK nor DUSK, the ProSe identifier of ranging and sidelink positioning and the SLPK ID are not encrypted.

In order to initiate the 5G ProSe direct link establishment procedure, the initiating UE shall create a PROSE DIRECT LINK ESTABLISHMENT REQUEST message. The initiating UE:

a) shall include the source user info set to the initiating UE's application layer ID received from upper layers, or set to the user info of the source 5G ProSe end UE if the 5G ProSe direct link establishment procedure is for 5G ProSe direct communication between the 5G ProSe end UE and the 5G ProSe UE-to-UE relay UE;

b) shall include the ProSe identifier(s) received from upper layer if the 5G ProSe direct link establishment procedure is not for 5G ProSe direct communication between the 5G ProSe remote UE and the 5G ProSe UE-to-network relay UE;

c) shall include the target user info set to the target UE's application layer ID if received from upper layers or if known based on the unicast layer-2 ID of target UE (i.e. destination layer-2 ID) as described in clause 5.8.2.4 of 3GPP TS 23.304 [3], to the user info ID of the 5G ProSe UE-to-network relay UE obtained during the 5G ProSe UE-to-network relay discovery procedure if the initiating UE is acting as a 5G ProSe remote UE, or to the user info of the target 5G ProSe end UE if:

1) the initiating UE is acting as the source 5G ProSe end UE and the user info of the target 5G ProSe end UE is obtained during the 5G ProSe UE-to-UE relay discovery procedure or received from upper layers in case of 5G ProSe direct link establishment with integrated discovery; or 2) the initiating UE is acting as the 5G ProSe UE-to-UE relay UE and the user info of the target 5G ProSe end UE is obtained in the PROSE DIRECT LINK ESTABLISHMENT REQUEST message or PROSE DIRECT LINK MODIFICATION REQUEST message from the source 5G ProSe end UE;

ca) shall include the UE-to-UE relay UE user info set to the user info ID of the 5G ProSe UE-to-UE relay UE:

1) if obtained during the 5G ProSe UE-to-UE relay discovery procedure and the 5G ProSe direct link establishment procedure is for 5G ProSe direct communication between the source 5G ProSe end UE and the 5G ProSe UE-to-UE relay UE; or 2) if the initiating UE is acting as the 5G ProSe UE-to-UE relay UE and user info ID is configured at configuration parameters for 5G ProSe UE-to-UE relay as specified in clause 5.2.7;

cb) shall include the target end UE layer-2 ID set to the layer-2 ID of the target 5G ProSe end UE, if the initiating UE is acting as the source 5G ProSe end UE and the layer-2 ID of the target 5G ProSe end UE is available in the source 5G ProSe end UE via the previous direct communication;

d) if the 5G ProSe direct link is neither for direct communication between the 5G ProSe remote UE and the 5G ProSe UE-to-network relay UE, nor for direct communication between the 5G ProSe end UE and the 5G ProSe UE-to-UE relay UE using the security procedure with network assistance:

1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed";

NOTE 3: The key establishment information container is provided by upper layers.

e) shall include:

1) a Nonce_1, if the direct communication is neither between the 5G ProSe remote UE and the 5G ProSe UE-to-network relay UE nor between the 5G ProSe end UE and the 5G ProSe UE-to-UE relay UE and the direct communication is not for ProSe identifier of ranging and sidelink positioning, or if the direct communication is between the 5G ProSe remote UE and the 5G ProSe UE-to-network relay UE or between the source 5G ProSe end UE and the 5G ProSe UE-to-UE relay UE and the security procedure over control plane is used as specified in 3GPP TS 33.503 [34];

2) a $K_{NRP}$ freshness parameter 1, if the direct communication is between the 5G ProSe remote UE and the 5G ProSe UE-to-network relay UE or between the source 5G ProSe end UE and the 5G ProSe UE-to-UE relay UE and the security procedure over user plane is used as specified in 3GPP TS 33.503 [34]; or 3) a $K_{SLP}$ freshness parameter 1, if the direct communication is for ProSe identifier of ranging and sidelink positioning as specified in 3GPP TS 33.533 [55];

set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

NOTE 4: The Nonce_1 IE in the PROSE DIRECT LINK ESTABLISHMENT REQUEST message is used to hold the value of Nonce_1 or $K_{NRP}$ freshness parameter 1.

f) shall include its UE security capabilities indicating the list of algorithms that the initiating UE supports for the security establishment of this 5G ProSe direct link;

g) shall include the MSB of $K_{NRP\text{-}sess}$ ID chosen by the initiating UE as specified in 3GPP TS 33.503 [34] if:

1) the direct communication is not for ProSe identifier of ranging and sidelink positioning;

2) the direct communication is not between the target 5G ProSe end UE and the 5G ProSe UE-to-UE relay UE using the security procedure with network assistance; and 3) the UE PC5 unicast signalling integrity protection policy is set to "Signalling integrity protection required" or "Signalling integrity protection preferred";

NOTE 5: If the direct communication is neither between the 5G ProSe remote UE and the 5G ProSe UE-to-network relay UE, nor between the 5G ProSe end UE and the 5G ProSe UE-to-UE relay UE using the security procedure with network assistance, the $K_{NRP\text{-}sess}$ ID holds the ID that corresponds to $K_{NRP\text{-}sess}$. If the direct communication is between the 5G ProSe remote UE and the 5G ProSe UE-to-network relay UE, or between the 5G ProSe end UE and the 5G ProSe UE-to-UE relay UE using the security procedure with network assistance, the $K_{NRP\text{-}sess}$ ID holds the ID that corresponds to $K_{NRP\text{-}sess}$ (if security procedure over user plane is used) or $K_{relay\text{-}sess}$ (if security procedure over control plane is used).

g1) shall include the MSB of $K_{SLP\text{-}sess}$ ID chosen by the initiating UE as specified in 3GPP TS 33.533 [55] if:

1) the direct communication is for ProSe identifier of ranging and sidelink positioning;

2) the direct communication is not between the target 5G ProSe end UE and the 5G ProSe UE-to-UE relay UE using the security procedure with network assistance; and 3) the UE PC5 unicast signalling integrity protection policy is set to "Signalling integrity protection required" or "Signalling integrity protection preferred";

h) may include a $K_{NRP}$ ID if the initiating UE has an existing $K_{NRP}$ for the target UE and the direct communication is neither between the 5G ProSe remote UE and the 5G ProSe UE-to-network relay UE nor between the 5G ProSe end UE and the 5G ProSe UE-to-UE relay UE using the security procedure with network assistance;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, and the RSC is not specific for emergency services, the Signalling integrity protection policy shall be set to "Signalling integrity protection required". In case the 5G ProSe direct link establishment procedure is for direct communication between 5G ProSe remote UE and 5G ProSe UE-to-network relay UE, the RSC is specific for emergency services, and the initiating UE has a valid USIM, the Signalling integrity protection policy shall be set to "Signalling integrity protection preferred". In case the 5G ProSe direct link establishment procedure is for direct communication between 5G ProSe remote UE and 5G ProSe UE-to-network relay UE, the RSC is specific for emergency services, and the initiating UE does not have a valid USIM, the Signalling integrity protection policy shall be set to "Signalling integrity protection not needed";

j) shall include the Relay service code IE set to:

1) the relay service code of the target relay UE if the 5G ProSe direct link establishment procedure is for direct communication between the 5G ProSe remote UE and the 5G ProSe UE-to-network relay UE; or 2) the relay service code indicating the connectivity service requested by the source 5G ProSe end UE if the 5G ProSe direct link establishment procedure is for direct communication between the (source or target) 5G ProSe end UE and the 5G ProSe UE-to-UE relay UE;

k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE or between the 5G ProSe end UE and the 5G ProSe UE-to-UE relay UE;

l) shall include the UE identity IE set to the SUCI of the initiating UE if:

1) the 5G ProSe direct link establishment procedure is for direct communication between the 5G ProSe remote UE and the 5G ProSe UE-to-network relay UE or between the source 5G ProSe end UE and the 5G ProSe UE-to-UE relay UE;

2) the RSC is not specific for emergency services or the initiating UE has a valid USIM; and 3) the security for 5G ProSe UE-to-network relay or 5G ProSe UE-to-UE relay uses the security procedure over control plane and the initiating UE does not have a valid CP-PRUK as specified in 3GPP TS 33.503 [34], or, the security for 5G ProSe UE-to-network relay or 5G ProSe UE-to-UE relay uses the security procedure over user plane and the initiating UE does not have a valid UP-PRUK as specified in 3GPP TS 33.503 [34];

la) shall include the UE identity IE set to the PEI of the initiating UE if:

1) the 5G ProSe direct link establishment procedure is for direct communication between the 5G ProSe remote UE and the 5G ProSe UE-to-network relay UE;

2) the RSC is specific for emergency services; and 3) the initiating UE does not have a valid USIM;

m) shall include the User security key ID IE set to:

1) UP-PRUK ID of the initiating UE if:

i) the 5G ProSe direct link establishment procedure is for direct communication between the 5G ProSe remote UE and the 5G ProSe UE-to-network relay UE or for direct communication between the source 5G ProSe end UE and the 5G ProSe UE-to-UE relay UE;

ii) the initiating UE has a valid UP-PRUK; and iii) the security for 5G ProSe UE-to-network relay or 5G ProSe UE-to-UE relay uses the security procedure over user plane as specified in 3GPP TS 33.503 [34];

2) CP-PRUK ID of the initiating UE that is associated with the relay service code of the target UE if:

i) the 5G ProSe direct link establishment procedure is for direct communication between the 5G ProSe remote UE and the 5G ProSe UE-to-network relay UE or for direct communication between the source 5G ProSe end UE and the 5G ProSe UE-to-UE relay UE;

ii) the initiating UE has a valid CP-PRUK is associated with the relay service code of the target UE; and iii) the security for 5G ProSe UE-to-network relay or 5G ProSe UE-to-UE relay uses the security procedure over control plane as specified in 3GPP TS 33.503 [34]; or 3) SLPK ID of the initiating UE that is associated with the ProSe identifier of ranging and sidelink positioning if:

i) the 5G ProSe direct link establishment procedure is for direct communication for ProSe identifier of ranging and sidelink positioning; and ii) the initiating UE has a valid SLPK is associated with the ProSe identifier of ranging and sidelink positioning;

n) shall include the HPLMN ID of the initiating UE, if the UP-PRUK ID of the initiating UE is included and is not in NAI format (see 3GPP TS 33.503 [34]);

o) shall include the MIC IE set to the calculated MIC value as specified in clause 6.3.5.3 of 3GPP TS 33.503 [34] if the 5G ProSe direct link establishment procedure is for direct communication between the 5G ProSe remote UE and the 5G ProSe UE-to-network relay UE or between the 5G ProSe end UE and the 5G ProSe UE-to-UE relay UE and the UE has the DUIK;

o1) shall include the MIC IE set to the calculated MIC value as specified in 3GPP TS 33.533 [55] if the 5G ProSe direct link establishment procedure is for ProSe identifier of ranging and sidelink positioning and the UE has the DUIK; and p) shall include the relay indication which indicates that the PROSE DIRECT LINK ESTABLISHMENT REQUEST message can be forwarded by a 5G ProSe UE-to-UE relay UE, if the 5G ProSe direct link establishment procedure is for direct communication between the source 5G ProSe end UE and 5G ProSe UE-to-UE relay UE with integrated discovery;

After the PROSE DIRECT LINK ESTABLISHMENT REQUEST message is generated, the initiating UE shall pass this message to the lower layers for transmission along with the source layer-2 ID and destination layer-2 ID as follows:

a) if the 5G ProSe direct communication is in a consequence of 5G ProSe direct discovery as defined in clause 6.2.14, clause 6.2.15, clause 8.2.1, clause 8a.2.1, or clause 6.2 in 3GPP TS 24.514 [56]:
self-assign a source layer-2 ID, and
1) the destination layer-2 ID set to the target end UE layer-2 ID if received in the PROSE DIRECT LINK ESTABLISHMENT REQUEST message or PROSE DIRECT LINK MODIFICATION REQUEST message from the source 5G ProSe end UE and if the initiating UE is acting as the 5G ProSe UE-to-UE relay UE; or
2) otherwise, the destination layer-2 ID set to the source layer-2 ID in the received PROSE PC5 DISCOVERY message for discovery announcement or discovery response;

b) if the initiating UE is acting as the source 5G ProSe end UE and the 5G ProSe direct link establishment procedure is for direct communication between the source 5G ProSe end UE and 5G ProSe UE-to-UE relay UE with integrated discovery:
self-assign a source layer-2 ID, and set the destination layer-2 ID to the broadcast destination layer-2 ID configured as specified in clause 5.2.4;

c) if the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery:
self-assign a source layer-2 ID, and set the destination layer-2 ID to:
1) the target end UE layer-2 ID, if received in the PROSE DIRECT LINK ESTABLISHMENT REQUEST message from the source 5G ProSe end UE; otherwise
2) the broadcast destination layer-2 ID configured as specified in clause 5.2.4; or d) otherwise:
self-assign a source layer-2 ID, and the destination layer-2 ID set to the destination layer-2 ID used for unicast initial signalling as specified in clause 5.2.4, NOTE 6: The UE implementation ensures that any value of the self-assigned source layer-2 ID in a), b), c) and d) is different from any other self-assigned source layer-2 ID(s) in use for 5G ProSe direct discovery as specified in clause 6.2.14, clause 6.2.15, clause 8.2.1 and clause 8a.2.1, and is different from any other provisioned destination layer-2 ID(s) as specified in clause 5.2.

NOTE 6A: The UE implementation ensures that any value of the self-assigned source layer-2 ID in a), b) and c) is different from any self-assigned source layer-2 ID(s) in use for 5G ProSe direct communication of a data unit type different from the data unit type of the 5G ProSe direct link being established, if the 5G ProSe direct link establishment procedure is for 5G ProSe direct communication between the 5G ProSe layer-3 UE-to-UE relay UE and the target 5G ProSe layer-3 end UE.

NOTE 6B: The UE implementation ensures that any value of the self-assigned source layer-2 ID in a), b) and c) is different from any other self-assigned source layer-2 ID(s) in use for 5G ProSe direct communication for Unstructured traffic and a different pair of the user info of the source 5G ProSe end UE and the user info of the target 5G ProSe end UE, if the 5G ProSe direct link establishment procedure is for 5G ProSe direct communication between the 5G ProSe layer-3 UE-to-UE relay UE and the target 5G ProSe layer-3 end UE and for Unstructured traffic.

NOTE 7: It is possible for the initiating UE to reuse the initiating UE's layer-2 ID used in previous 5G ProSe direct link with the same peer UE, except when the 5G ProSe direct link establishment procedure is for 5G ProSe direct communication between the 5G ProSe layer-3 UE-to-UE relay UE and the target 5G ProSe layer-3 end UE for Unstructured traffic and a different pair of the user info of the source 5G ProSe end UE and the user info of the target 5G ProSe end UE, and except when the 5G ProSe direct link establishment procedure is for 5G ProSe direct communication between the 5G ProSe layer-3 UE-to-UE relay UE and the target 5G ProSe layer-3 end UE for a data unit type different than the data unit type of the previous 5G ProSe direct link.
and start timer T5080.

NOTE 8: A default PC5 DRX configuration is used for transmitting the PROSE DIRECT LINK ESTABLISHMENT REQUEST message as specified in 3GPP TS 38.300 [21].

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 9: In order to ensure successful 5G ProSe direct link establishment, T5080 should be set to a value larger than the sum of T5089 and T5092.

US 12,610,412 B2

23

Figure 10:
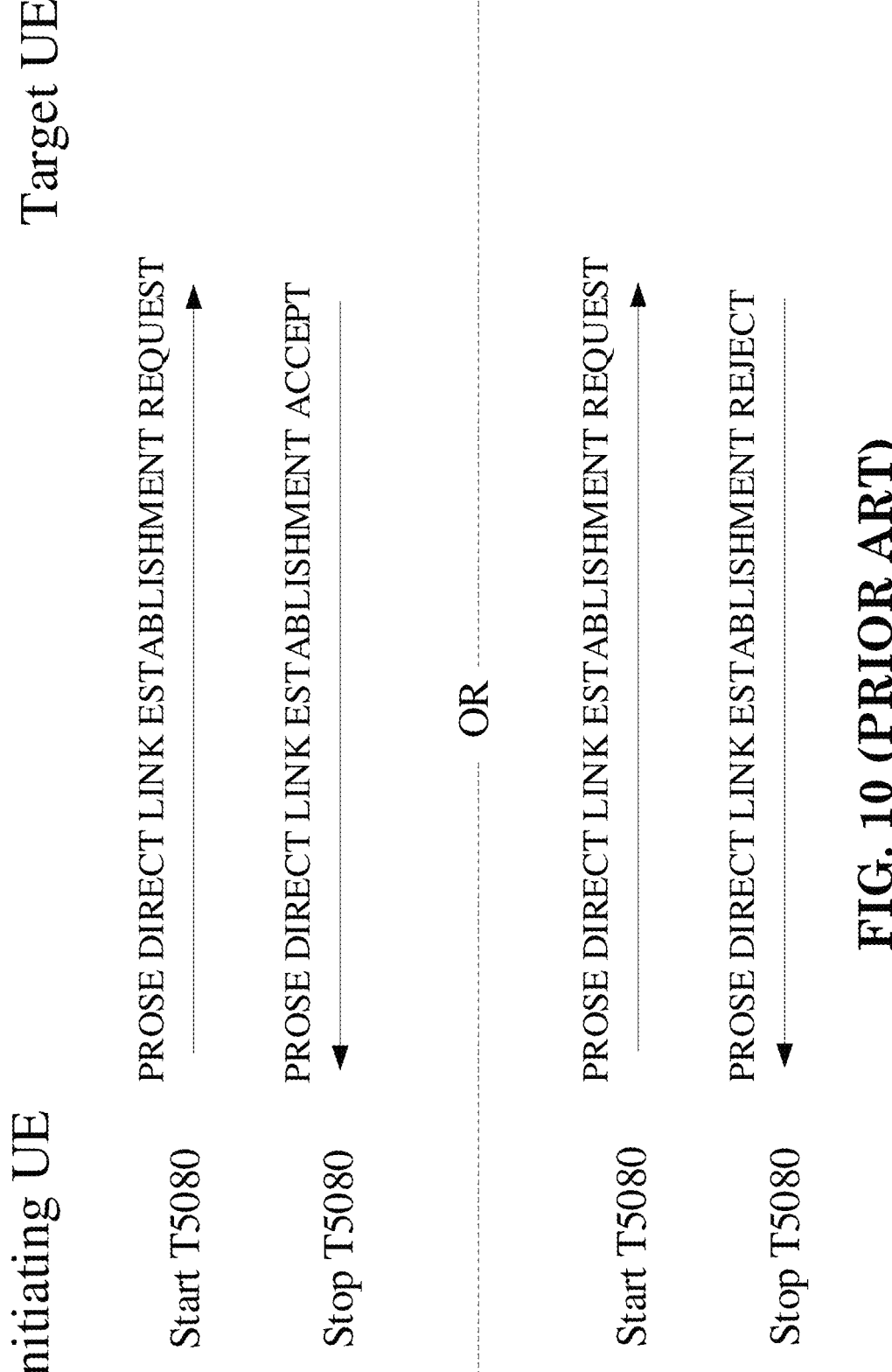
FIG. 10 is a reproduction of Figure 7.2.2.2.1 of 3GPP TS 24.554 V18.4.0.

Figure 7.2.2.2.1 of 3GPP TS 24.554 V18.4.0, Entitled "UE Oriented 5G ProSe Direct Link Establishment Procedure", is Reproduced as FIG. 10

Figure 7.2.2.2.2 of 3GPP TS 24.554 V18.4.0, Entitled "ProSe Service Oriented 5G ProSe Direct Link Establishment Procedure", is Reproduced as FIG. 11

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

NOTE 1: A default PC5 DRX configuration is used for receiving the PROSE DIRECT LINK ESTABLISHMENT REQUEST message as specified in 3GPP TS 38.300 [21].

If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted:

a) relay service code; and b) UP-PRUK ID or CP-PRUK ID, if received, using the DUCK or DUSK used for 5G ProSe UE-to-network relay discovery (see clause 6.3.5.2 of 3GPP TS 33.503 [34]), and verifies if the relay service code matches with the one that the target UE has sent during 5G ProSe UE-to-network relay discovery procedure. To retrieve the DUIK for integrity verification and retrieve the DUCK or DUSK for decryption, the target UE shall use the Destination Layer-2 ID of the received PROSE DIRECT LINK ESTABLISHMENT REQUEST message. The target UE shall match the destination layer-2 ID with the source layer-2 ID stored in the maintained association for the UE-to-network relay discovery procedure as described in clause 8.2.1.2.2.2 and clause 8.2.1.3.2.2. For the matched source layer-2 ID, the target UE shall use the associated relay service code to identify the provisioned DUIK, DUCK or DUSK.

NOTE 2: If the UE is neither configured with DUCK nor DUSK, the relay service code and the UP-PRUK ID or CP-PRUK ID are not encrypted.

If the PROSE DIRECT LINK ESTABLISHMENT REQUEST message is for 5G ProSe direct communication between the 5G ProSe end UE and the 5G ProSe UE-to-UE relay UE, the target UE shall verify the MIC field in the received PROSE DIRECT LINK ESTABLISHMENT REQUEST with the DUIK, if any, and decrypts the encrypted:

a) relay service code; and b) UP-PRUK ID or CP-PRUK ID, if received, using the DUCK or DUSK used for 5G ProSe UE-to-UE relay discovery (see clause 6.3.5.2 of 3GPP TS 33.503 [34]), and verifies if the relay service code matches with the one that the target UE has sent during 5G ProSe UE-to-UE relay discovery procedure.

NOTE 2A: If the UE is neither configured with DUCK nor DUSK, the relay service code and the UP-PRUK ID or CP-PRUK ID are not encrypted.

If the PROSE DIRECT LINK ESTABLISHMENT REQUEST message is for ProSe identifier of ranging and sidelink positioning, the target UE shall verify the MIC field in the received PROSE DIRECT LINK ESTABLISHMENT REQUEST with the DUIK, if any, and decrypts the encrypted:

a) the ProSe identifier of ranging and sidelink positioning; and b) the SLPK ID, if available, using the DUCK or DUSK used for ranging and sidelink positioning UE discovery, and verifies if the ProSe identifier of ranging and sidelink positioning matches with the one that the target UE has sent during ranging and sidelink positioning UE discovery.

NOTE 2B: If the UE is neither configured with DUCK nor DUSK, the ProSe identifier of ranging and sidelink positioning and the SLPK ID are not encrypted.

If the target UE is acting as the target 5G ProSe end UE and the 5G ProSe direct link establishment procedure is for direct communication between the 5G ProSe UE-to-UE relay UE and target 5G ProSe end UE with integrated discovery, the target UE upon reception of the PROSE DIRECT LINK ESTABLISHMENT REQUEST messages which contain the same source user info, ProSe identifier(s) and relay service code as received from multiple 5G ProSe UE-to-UE relay UEs, selects one of the 5G ProSe UE-to-UE relay UEs via which to communicate with the source 5G ProSe end UE as specified in TS 23.304, clause 6.7.3.2.

If the 5G ProSe direct link establishment procedure is neither for direct communication between the 5G ProSe remote UE and the 5G ProSe UE-to-network relay UE, nor for direct communication between the 5G ProSe end UE and the 5G ProSe UE-to-UE relay UE using the security procedure with network assistance, and the 5G ProSe direct link establishment procedure is not for direct communication for ProSe identifier of ranging and sidelink positioning, the target UE may initiate 5G ProSe direct link authentication procedure as specified in clause 7.2.12 and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, or for direct communication between the source 5G ProSe end UE and the 5G ProSe UE-to-UE relay UE using the security procedure with network assistance, upon reception of the PROSE DIRECT LINK ESTABLISHMENT REQUEST messages, and the initiating UE is identified by a SUCI, a CP-PRUK ID or a UP-PRUK ID, the target UE shall proceed with either:

a) the authentication and key agreement procedure as specified in clause 5.5.4 of 3GPP TS 24.501 [11] if the security procedure over control plane as specified in 3GPP TS 33.503 [34] is used; or b) the key request procedure as specified in clause 8.2.10.2.4 if the security procedure over user plane as specified in 3GPP TS 33.503 [34] is used;

and if:

a) the security procedure over control plane or the security procedure over user plane as specified in 3GPP TS 33.503 [34] is completed successfully; or b) the security procedure over control plane or the security procedure over user plane as specified in 3GPP TS 33.503 [34] fails, the RSC is specific for emergency services, and providing 5G ProSe direct link for emergency services without 5G ProSe direct link security is required by the target UE's configuration;

shall initiate 5G ProSe direct link security mode control procedure as specified in clause 7.2.10.

NOTE 3: The target UE's configuration that indicates whether providing 5G ProSe direct link for emergency services without 5G ProSe direct link security is required or not is set based on the regulation and the operator policy. It is up to implementation how this information is known in the target UE.

If the 5G ProSe direct link establishment procedure is for direct communication between the 5G ProSe UE-to-UE relay UE and the target 5G ProSe end UE using the security procedure with network assistance, upon reception of the PROSE DIRECT LINK ESTABLISHMENT REQUEST messages, the target UE shall proceed with 5G ProSe direct link security request procedure as specified in clause 8a.2.10.

If the 5G ProSe direct link establishment procedure is for direct communication for ProSe identifier of ranging and sidelink positioning, the target UE shall proceed with the SLP key request procedure as specified in clause 8.3.1.1.2 in 3GPP TS 24.514 [56], and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, the RSC is specific for emergency services, the initiating UE is identified by a PEI, and providing 5G ProSe direct link for emergency services without 5G ProSe direct link security is required by the target UE's configuration, the target UE shall initiate 5G ProSe direct link security mode control procedure as specified in clause 7.2.10.

The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context.

If:
a) the target user info IE is included in the PROSE DIRECT LINK ESTABLISHMENT REQUEST message and this IE includes the target UE's application layer ID; or
b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;

then the target UE shall:
a) if the direct communication is neither between the 5G ProSe remote UE and the 5G ProSe UE-to-network relay UE, nor for direct communication between the 5G ProSe end UE and the 5G ProSe UE-to-UE relay UE using the security procedure with network assistance. The 5G ProSe direct link establishment procedure is not for direct communication for ProSe identifier of ranging and sidelink positioning:
1) identify an existing $K_{NRP}$ based on the $K_{NRP}$ ID included in the PROSE DIRECT LINK ESTAB-LISHMENT REQUEST message; or
2) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12;

b) if the direct communication is between the 5G ProSe remote UE and the 5G ProSe UE-to-network relay UE or between the 5G ProSe end UE and the 5G ProSe UE-to-UE relay UE, the initiating UE is identified by a SUCI or a CP-PRUK ID, and the security procedure over control plane as specified in 3GPP TS 33.503 [34] is used, request a new $K_{NR\_ProSe}$ according to the security procedure over user plane as specified in 3GPP TS 33.503 [34];
c) if the direct communication is between the 5G ProSe remote UE and the 5G ProSe UE-to-network relay UE or between the 5G ProSe end UE and the 5G ProSe UE-to-UE relay UE, the initiating UE is identified by a SUCI or a UP-PRUK ID, and the security procedure over user plane as specified in 3GPP TS 33.503 [34] is used, request a new $K_{NRP}$ according to the security procedure over user plane; and
NOTE 4: How many times the 5G ProSe direct link authentication procedure needs to be performed to derive a new $K_{NRP}$ depends on the authentication method used.
d) if the direct communication is between the 5G ProSe remote UE and the 5G ProSe UE-to-network relay UE, the RSC is specific for emergency services, the initiating UE is identified by a PEI, and providing 5G ProSe direct link for emergency services without 5G ProSe direct link security is required by the target UE's configuration, generate a new $K_{NRP}$ in an implementation defined way.
e) if the 5G ProSe direct link establishment procedure is for direct communication for ProSe identifier of ranging and sidelink positioning, request a new $K_{SLP}$ according to the security procedure as specified in 3GPP TS 33.533 [55].

If the direct communication is between the 5G ProSe remote UE and the 5G ProSe UE-to-network relay UE, the RSC is specific for emergency services, the security procedure over control plane or the security procedure over user plane as specified in 3GPP TS 33.503 [34] fails, and providing 5G ProSe direct link for emergency services without 5G ProSe direct link security is required by the target UE's configuration, the target UE shall generate a new $K_{NR\_ProSe}$ or $K_{NRP}$ in an implementation defined way.

After an existing $K_{NRP}$ or $K_{SLP}$ was identified or a new $K_{NRP}$ or $K_{SLP}$ was derived, or after a new $K_{NRP}$ or $K_{NR\_ProSe}$ or $K_{SLP}$ is received or a new $K_{NR\_ProSe}$ or $K_{NRP}$ were generated, the target UE shall initiate a 5G ProSe direct link security mode control procedure as specified in clause 7.2.10. Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

If the direct communication is between the 5G ProSe remote UE and the 5G ProSe UE-to-network relay UE, the RSC is specific for emergency services, the security procedure over control plane or the security procedure over user plane as specified in 3GPP TS 33.503 [34] fail, and providing 5G ProSe direct link for emergency services without 5G ProSe direct link security is required by the target UE's configuration, before sending the PROSE DIRECT LINK ESTABLISHMENT ACCEPT message to the 5G ProSe remote UE, the target UE shall perform the 5G ProSe direct link remote identity procedure to fetch PEI.

Before sending the PROSE DIRECT LINK ESTABLISH-MENT ACCEPT message to the 5G ProSe remote UE, the target UE acting as a 5G ProSe layer-3 UE-to-network relay UE initiates the UE requested PDU session establishment procedure as specified in 3GPP TS 24.501 [11] if:

1) the PDU session for relaying the service associated with the RSC has not been established yet; or 2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:

a) shall include the source user info set to the target UE's application layer ID received from upper layers, or set to the user info of the target 5G ProSe end UE if the 5G ProSe direct link establishment procedure is for 5G ProSe direct communication between the 5G ProSe end UE and the 5G ProSe UE-to-UE relay UE;

aa) shall include the UE-to-UE relay UE user info set to the user info ID of the 5G ProSe UE-to-UE relay UE if the 5G ProSe direct link establishment procedure is for 5G ProSe direct communication between the source 5G ProSe end UE and the 5G ProSe UE-to-UE relay UE;

b) shall include PQFI(s), the corresponding PC5 QoS parameters and optionally the ProSe identifier(s) that the target UE accepts, if the target UE is not acting as a 5G ProSe layer-2 UE-to-network relay UE and the 5G ProSe direct link establishment procedure is not with integrated discovery;

c) may include the PC5 QoS rule(s) if the target UE is not acting as a 5G ProSe layer-2 UE-to-network relay UE and the 5G ProSe direct link establishment procedure is not with integrated discovery;

d) shall include an IP address configuration IE set to one of the following values if IP communication is used and the target UE is not acting as a 5G ProSe layer-2 UE-to-network relay UE, 5G ProSe layer-2 UE-to-UE relay UE or 5G ProSe layer-3 UE-to-UE relay UE using the security procedure with network assistance:

1) "DHCPv4 server" if only IPv4 address allocation mechanism is supported by the target UE, i.e., acting as a DHCPv4 server;

2) "IPv6 router" if only IPv6 address allocation mechanism is supported by the target UE, i.e., acting as an IPv6 router;

3) "DHCPv4 server & IPv6 Router" if both IPv4 and IPv6 address allocation mechanism are supported by the target UE; or 4) "address allocation not supported" if neither IPv4 nor IPv6 address allocation mechanism is supported by the target UE and the target UE is not acting as a 5G ProSe layer-3 UE-to-network relay UE;

NOTE 5: The UE doesn't include an IP address configuration IE nor a link local IPv6 address IE if Ethernet or Unstructured data unit type is used for communication.

e) shall include a link local IPv6 address IE formed locally based on IETF RFC 4862 [25] if IP address configuration IE is set to "address allocation not supported", the received PROSE DIRECT LINK SECURITY MODE COMPLETE message included a link local IPv6 address IE and the target UE is not acting as a 5G ProSe layer-2 UE-to-network relay UE, 5G ProSe layer-3 UE-to-network relay UE, or 5G ProSe layer-2 UE-to-UE relay UE or 5G ProSe layer-3 UE-to-UE relay UE using the security procedure with network assistance;

f) shall include the configuration of UE PC5 unicast user plane security protection based on the agreed user plane security policy, as specified in 3GPP TS 33.503 [34]. If the direct communication is between the 5G ProSe remote UE and the 5G ProSe UE-to-network relay UE, the RSC is specific for emergency services, and:

1) the security procedure over control plane or the security procedure over user plane as specified in 3GPP TS 33.503 [34] fails; or 2) the initiating UE is identified by a PEI;

the target UE shall include the user plane integrity protection configuration set to "off" and the user plane ciphering configuration set to "off";

g) if the 5G ProSe direct link establishment procedure is for 5G ProSe direct communication between the source or target 5G ProSe layer-3 end UE and the 5G ProSe layer-3 UE-to-UE relay UE, and for Ethernet traffic, shall include the MAC address of the target 5G ProSe layer-3 end UE; and h) may include a target 5G ProSe layer-3 end UE IP address IE set to the IP address of the target 5G ProSe layer-3 end UE, if the 5G ProSe direct link establishment procedure is for 5G ProSe direct communication between the source 5G ProSe layer-3 end UE and the 5G ProSe layer-3 UE-to-UE relay UE, and the data unit type for the communication is IP.

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:

a) at least one of ProSe identifiers for the 5G ProSe direct links satisfies the privacy requirements as specified in clause 5.2.4; or b) T5090 is configured as specified in clause 5.2.5.

NOTE 6: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISH-MENT ACCEPT message, the target UE shall provide the following information along with the layer-2 IDs to the lower layer, which enables the lower layer to handle the coming PC5 signalling or traffic data:

a) the PC5 link identifier self-assigned for this 5G ProSe direct link;

b) PQFI(s) and its corresponding PC5 QoS parameters, if available;

c) an indication of activation of the PC5 unicast user plane security protection for the 5G ProSe direct link, if applicable; and d) an indication of emergency services for the 5G ProSe direct link if the 5G ProSe direct link is established with the RSC specific for emergency services between the 5G ProSe layer-2 remote UE and the 5G ProSe layer-2 UE-to-network relay UE.

If the target UE accepts the 5G ProSe direct link establishment request and the 5G ProSe direct link is established not for 5G ProSe direct communication between the 5G ProSe remote UE and the 5G ProSe UE-to-network relay UE and not for 5G ProSe direct communication between the 5G ProSe end UE and the 5G ProSe UE-to-UE relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6. If the 5G ProSe direct link is established for 5G ProSe direct communication between the 5G ProSe layer-3 end UE and the 5G ProSe layer-3 UE-to-UE relay UE, then the target UE may perform the PC5 QoS flow establishment over 5G ProSe direct link as specified in clause 8a.2.7.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISH-MENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISH-MENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

If the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery, the initiating UE upon receipt of the PROSE DIRECT LINK ESTABLISHMENT ACCEPT message from the target 5G ProSe end UE, shall initiate the 5G ProSe direct link security mode control procedure with the source 5G ProSe end UE, and the initiating UE upon successful completion of the 5G ProSe direct link security mode control procedure with the source 5G ProSe end UE, shall create a PROSE DIRECT LINK ESTABLISHMENT ACCEPT message as specified in clause 7.2.2.3 to send to the source 5G ProSe end UE. If the target user info IE is not included in the PROSE DIRECT LINK ESTABLISHMENT REQUEST message, the initiating UE acting as the 5G ProSe UE-to-UE relay UE may initiate the 5G ProSe direct link security mode control procedure with the source 5G ProSe end UE after handling multiple response messages (i.e., the PROSE DIRECT LINK ESTABLISHMENT ACCEPT message) from multiple target end UEs.

After receiving the PROSE DIRECT LINK ESTABLISH-MENT ACCEPT message, the initiating UE shall provide the following information along with the layer-2 IDs to the lower layer, which enables the lower layer to handle the coming PC5 signalling or traffic data:

a) the PC5 link identifier self-assigned for this 5G ProSe direct link;
  b) PQFI(s) and its corresponding PC5 QoS parameters, if available; and c) an indication of activation of the PC5 unicast user plane security protection for the 5G ProSe direct link, if applicable.

The initiating UE shall start timer T5090 if:

a) at least one of ProSe identifiers for the 5G ProSe direct links satisfies the privacy requirements as specified in clause 5.2.4; or
  b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080.

If the 5G ProSe direct link establishment procedure is triggered by a PROSE DIRECT LINK MODIFICATION REQUEST message from the source 5G ProSe layer-3 end UE as specified in clause 7.2.3.2, upon receipt of the PROSE DIRECT LINK ESTABLISHMENT ACCEPT message, the initiating UE shall send a PROSE DIRECT LINK MODI-FICATION ACCEPT message to the source 5G ProSe layer-3 end UE as specified in clause 7.2.3.3, if the initiating UE acts as the 5G ProSe layer-3 UE-to-UE relay UE.

If the 5G ProSe direct link establishment procedure is for 5G ProSe direct communication between the 5G ProSe layer-3 UE-to-UE relay UE and the target 5G ProSe layer-3 end UE, for Ethernet traffic, and the initiating UE acting as the 5G ProSe layer-3 UE-to-UE relay UE detects that the MAC address of the target 5G ProSe layer-3 end UE in the PROSE DIRECT LINK ESTABLISHMENT ACCEPT mes-sage is not unique, i.e., the MAC address of the target 5G ProSe layer-3 end UE was also provided by another 5G ProSe layer-3 end UE in an existing ProSe 5G direct link, the 5G ProSe layer-3 UE-to-UE relay UE shall perform 5G ProSe direct link release procedure as specified in clause 7.2.6.

[ . . . ]

7.2.3 5G ProSe Direct Link Modification Procedure 7.2.3.1 General

The purpose of the 5G ProSe direct link modification procedure is to modify the existing ProSe direct link to:

a) add new PC5 QoS flow(s) to the existing 5G ProSe direct link;
  b) modify existing PC5 QoS flow(s) for updating PC5 QoS parameters of the existing PC5 QoS flow(s);
  c) modify existing PC5 QoS flow(s) for associating new ProSe application(s) with the existing PC5 QoS flow (s);
  d) modify existing PC5 QoS flow(s) for removing the associated ProSe application(s) from the existing PC5 QoS flow(s);
  e) remove existing PC5 QoS flow(s) from the existing 5G ProSe direct link;
  f) negotiate a new 5G ProSe UE-to-UE relay UE over the existing 5G ProSe direct link;
  g) establish 5G ProSe UE-to-UE relay communication with additional 5G ProSe layer-3 end UE(s) using the existing 5G ProSe direct link between the 5G ProSe layer-3 end UE and 5G ProSe layer-3 UE-to-UE relay UE;
  h) release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE; or i) establish 5G ProSe UE-to-UE relay communication with additional 5G ProSe layer-2 end UE(s) using the existing 5G ProSe direct link between the 5G ProSe layer-2 end UE and 5G ProSe layer-2 UE-to-UE relay UE.

In this procedure, the UE sending the PROSE DIRECT LINK MODIFICATION REQUEST message is called the "initiating UE" and the other UE is called the "target UE".

NOTE: The 5G ProSe direct link modification procedure is not applicable for 5G ProSe layer-2 UE-to-network relay case.

7.2.3.2 5G ProSe Direct Link Modification Procedure Initiated by Initiating UE The initiating UE shall meet the following pre-conditions before initiating this procedure for adding a new ProSe application to the existing 5G ProSe direct link:

a) there is a 5G ProSe direct link between the initiating UE and the target UE;

b) the pair of application layer IDs and the network layer protocol of this 5G ProSe direct link are identical to those required by the application layer in the initiating UE for this ProSe application;

c) the security policy corresponding to the ProSe identifier is aligned with the security policy of the existing 5G ProSe direct link;

d) the timer T5091 is not running; and e) the initiating UE is not performing the 5G ProSe direct link re-keying procedure initiated by the target UE.

The initiating UE shall meet the following pre-conditions before initiating this procedure for negotiating a new 5G ProSe UE-to-UE relay UE over the existing 5G ProSe direct link:

a) there is a 5G ProSe direct link between the initiating UE and the target UE;

b) the initiating UE is a source 5G ProSe end UE communicating with the target 5G ProSe end UE via a 5G ProSe UE-to-UE relay UE;

c) the initiating UE determines, e.g., based on PC5 signal strength, to perform UE-to-UE relay reselection; and d) the initiating UE obtains a list of candidate UE-to-UE relays via UE-to-UE discovery procedure.

The initiating UE shall meet the following pre-conditions before initiating this procedure for establishing 5G ProSe UE-to-UE relay communication with an additional 5G ProSe layer-3 end UE over the existing 5G ProSe direct link:

a) there is a 5G ProSe direct link between the initiating UE and the target UE;

b) the initiating UE acts as a 5G ProSe layer-3 end UE and the target UE acts as a 5G ProSe layer-3 UE-to-UE relay UE, or vice versa;

c) the initiating UE, if acting as a 5G ProSe layer-3 end UE, determines to communicate with an additional 5G ProSe layer-3 end UE using the same RSC as that of the existing 5G ProSe direct link; and d) the initiating UE, if acting as a 5G ProSe layer-3 UE-to-UE relay UE, receives a request from another 5G ProSe layer-3 end UE to communicate with the target UE using the same RSC as that of the existing 5G ProSe direct link.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:

a) shall include the PQFI(s), the corresponding PC5 QoS parameters and optionally the ProSe identifier(s);

b) shall include the link modification operation code set to "Add new PC5 QoS flow(s) to the existing 5G ProSe direct link";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Modify PC5 QoS parameters of the existing PC5 QoS flow(s)";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the destination layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Associate new ProSe application(s) with existing PC5 QoS flow(s)";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters including the ProSe identifier(s); and b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:

a) shall include the PQFI(s); and b) shall include the link modification operation code set to "Remove existing PC5 QoS flow(s) from the existing 5G ProSe direct link".

If the 5G ProSe direct link modification procedure is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, the initiating UE:

a) shall include the source end UE info set to the user info of the source 5G ProSe layer-3 end UE and the target end UE info set to the user info of the target 5G ProSe layer-3 end UE received in PROSE DIRECT LINK ESTABLISHMENT REQUEST message, if the UE acts as a 5G ProSe layer-3 UE-to-UE relay UE and the 5G ProSe direct link is between the 5G ProSe layer-3 UE-to-UE relay UE and the target 5G ProSe layer-3 end UE;

b) for Ethernet traffic, shall include the MAC address of the source 5G ProSe layer-3 end UE, if the UE acts as a 5G ProSe layer-3 UE-to-UE relay UE and the 5G ProSe direct link is between the 5G ProSe layer-3 UE-to-UE relay UE and the target 5G ProSe layer-3 end UE and shall include the MAC address of the source 5G ProSe layer-3 end UE, if:
  1) the UE acts as a source 5G ProSe layer-3 UE-to-UE end UE;
  2) the MAC address of the source 5G ProSe layer-3 end UE changed; and
  3) the 5G ProSe direct link is between the 5G ProSe layer-3 UE-to-UE relay UE and the source 5G ProSe layer-3 end UE;

c) shall include the target end UE info set to the user info of the additional target 5G ProSe layer-3 end UE to which the 5G ProSe UE-to-UE relay communication is requested, if the UE acts as a source 5G ProSe layer-3 end UE and the 5G ProSe direct link is between the source 5G ProSe layer-3 end UE and the 5G ProSe layer-3 UE-to-UE relay UE;

d) shall include the link modification operation code set to "Add new 5G ProSe layer-3 end UE to the existing 5G ProSe direct link";

e) may include the PQFI(s) and the corresponding PC5 QoS parameters including the ProSe identifier(s);

f) may include the PC5 QoS rule(s) to indicate the packet filters of the PC5 QoS flow(s); and g) may include the target end UE layer-2 ID set to the layer-2 ID of the target 5G ProSe layer-3 end UE, if the UE acts as a source 5G ProSe layer-3 end UE and the 5G ProSe direct link is between the source 5G ProSe layer-3 end UE and the 5G ProSe layer-3 UE-to-UE relay UE.

If the 5G ProSe direct link modification procedure is to establish 5G ProSe UE-to-UE relay communication with additional 5G ProSe layer-2 end UE using the existing 5G ProSe direct link between the 5G ProSe layer-2 end UE and 5G ProSe layer-2 UE-to-UE relay UE, the initiating UE shall create a PROSE DIRECT LINK MODIFICATION REQUEST message. In this message, the initiating UE:

a) shall include the source end UE info set to the user info of the source 5G ProSe layer-2 end UE and the target end UE info set to the user info of the target 5G ProSe layer-2 end UE received in PROSE DIRECT LINK ESTABLISHMENT REQUEST message, if the UE acts as a 5G ProSe layer-2 UE-to-UE relay UE and the 5G ProSe direct link is between the 5G ProSe layer-2 UE-to-UE relay UE and the target 5G ProSe layer-2 end UE;

b) shall include the target end UE info set to the user info of the additional target 5G ProSe layer-2 end UE to which the 5G ProSe UE-to-UE relay communication is requested, if the UE acts as a source 5G ProSe layer-2 end UE and the 5G ProSe direct link is between the source 5G ProSe layer-2 end UE and the 5G ProSe layer-2 UE-to-UE relay UE; and c) shall include the link modification operation code set to "Add new 5G ProSe layer-2 end UE to the existing 5G ProSe direct link".

If the 5G ProSe direct link modification procedure is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, initiating UE:

a) shall include the source end UE info set to the source user info of the 5G ProSe layer-3 end UE received in the PROSE DIRECT LINK RELEASE REQUEST message, if the UE acts as a 5G ProSe layer-3 UE-to-UE relay UE and the 5G ProSe direct link is between the 5G ProSe layer-3 UE-to-UE relay UE and the 5G ProSe layer-3 end UE;

b) shall include the target end UE info set to the user info of the peer 5G ProSe layer-3 end UE with which the 5G ProSe UE-to-UE relay communication is to be released, if the UE acts as a 5G ProSe layer-3 end UE and the 5G ProSe direct link is between the 5G ProSe layer-3 end UE and the 5G ProSe layer-3 UE-to-UE relay UE; and c) shall include the link modification operation code set to "Remove 5G ProSe layer-3 end UE from the existing 5G ProSe direct link".

If the 5G ProSe direct link modification procedure is to trigger the negotiated 5G ProSe layer-3 UE-to-UE relay reselection, the initiating UE shall create a PROSE DIRECT LINK MODIFICATION REQUEST message. In this message:

a) If the initiating UE acts as a source 5G ProSe layer-3 end UE and the 5G ProSe direct link is between the source 5G ProSe layer-3 end UE and the 5G ProSe layer-3 UE-to-UE relay UE, the initiating UE:
  1) shall include the relay reselection indication;
  2) shall include the list of user info IDs of the candidates 5G ProSe UE-to-UE relay UEs supporting the same RSC used for the existing 5G ProSe direct link;
  3) shall include the list of target 5G ProSe end UEs IP address/prefix, if IP communication is used; and
  4) may include the list of layer-2 IDs of the candidates 5G ProSe UE-to-UE relay UEs supporting the same RSC used for the existing 5G ProSe direct link; or b) If the initiating UE acts as a 5G ProSe layer-3 UE-to-UE relay UE and the 5G ProSe direct link is between the 5G ProSe layer-3 UE-to-UE relay UE and the target 5G ProSe end UE, the initiating UE:
  1) shall include the relay reselection indication;
  2) shall include the list of user info IDs of the candidates 5G ProSe UE-to-UE relay UEs supporting the same RSC used for the existing 5G ProSe direct link;
  3) shall include the initiating source 5G ProSe UE IP address/prefix, if IP communication is used; and
  4) may include list of layer-2 IDs of the candidates 5G ProSe UE-to-UE relay UEs supporting the same RSC used for the existing 5G ProSe direct link.

If the 5G ProSe direct link modification procedure is to trigger the negotiated 5G ProSe layer-3 UE-to-UE relay reselection and the initiating UE acts as a 5G ProSe layer-3 UE-to-UE relay UE, the initiating UE shall create a PROSE DIRECT LINK MODIFICATION REQUEST message for every IP address/prefix of the target 5G ProSe layer-3 end UEs received on the associated PROSE DIRECT LINK MODIFICATION REQUEST message from the source 5G ProSe layer-3 end UE.

If the 5G ProSe direct link modification procedure is to trigger the negotiated 5G ProSe layer-2 UE-to-UE relay reselection, the initiating UE shall create a PROSE DIRECT LINK MODIFICATION REQUEST message. In this message:

a) shall include the relay reselection indication;

b) shall include the list of candidates 5G ProSe UE-to-UE relay UE user info ID;

c) shall include the new MSBs of $K_{NRP}$ ID; and d) may include the list of candidates 5G ProSe UE-to-UE relay UE layer-2 ID.

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 12:
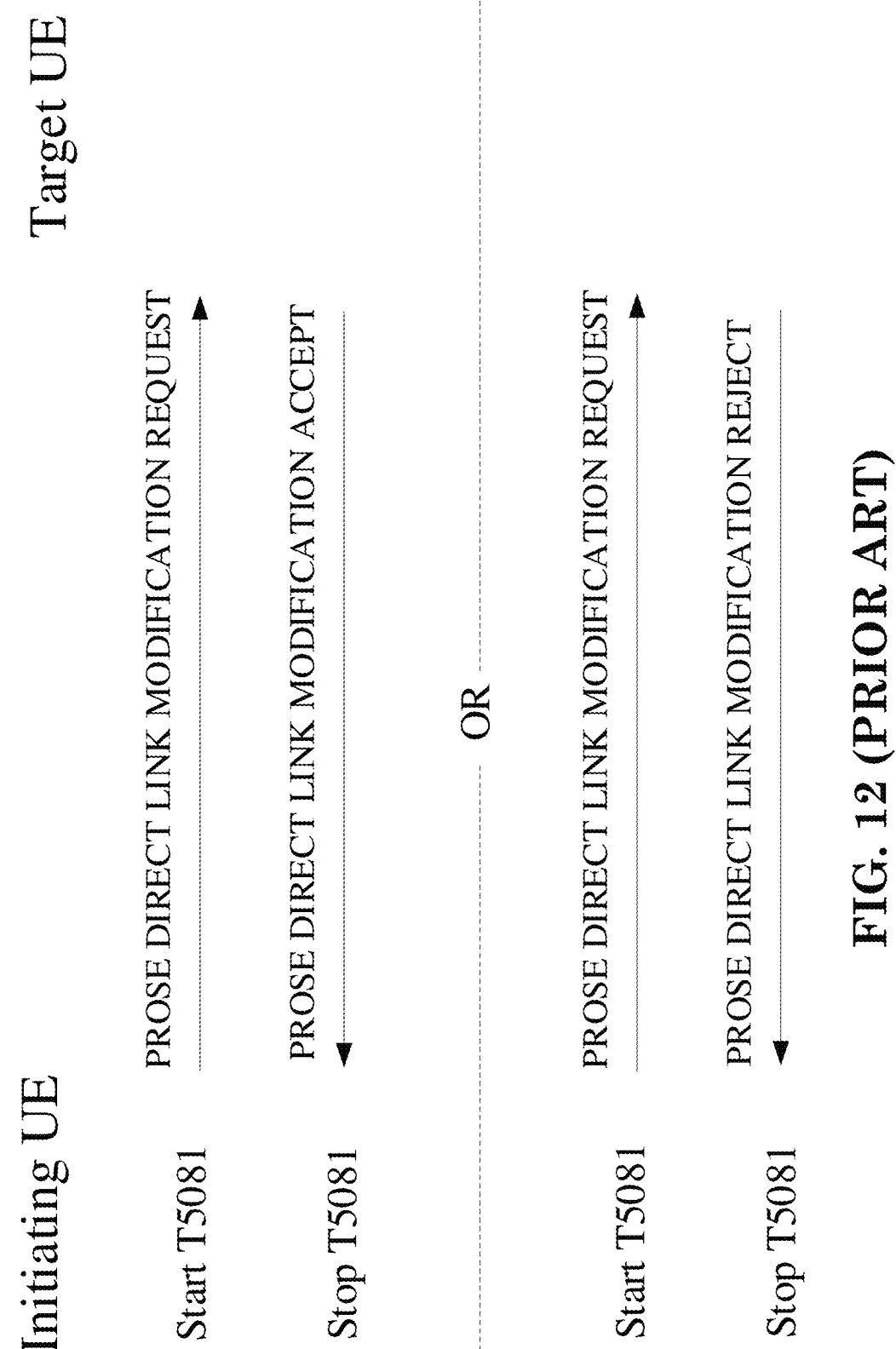
FIG. 12 is a reproduction of Figure 7.2.2.2.2 of 3GPP TS 24.554 V18.4.0.

Figure 7.2.3.2.1 of 3GPP TS 24.554 V18.4.0, Entitled "5G ProSe Direct Link Modification Procedure", is Reproduced as FIG. 12

Figure 7.2.3.2.2 of 3GPP TS 24.554 V18.4.0, Entitled "5G ProSe Direct Link Modification Procedure for the Negotiated 5G ProSe Layer-3 UE-to-UE Relay Reselection", is Reproduced as FIG. 13

7.2.3.3 5G ProSe Direct Link Modification Procedure Accepted by the Target UE

If the PROSE DIRECT LINK MODIFICATION REQUEST message is accepted, the target UE shall respond with the PROSE DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:

a) shall include the PQFI(s), the corresponding PC5 QoS parameters and optionally the ProSe identifier(s) that the target UE accepts;

b) may include the PC5 QoS rule(s) to indicate the packet filters of the PC5 QoS flow(s);

c) shall include the source end UE info set to the user info of the source 5G ProSe layer-3 end UE, if the UE acts as a target 5G ProSe layer-3 end UE, the 5G ProSe direct link is between the 5G ProSe layer-3 UE-to-UE relay UE and the target 5G ProSe layer-3 end UE, and the target 5G ProSe layer-3 end UE has established direct communication with multiple source 5G ProSe layer-3 end UEs via the 5G ProSe layer-3 UE-to-UE relay UE using the same 5G ProSe direct link;

d) may include the source end UE info set to the user info of the source 5G ProSe end UE, if the UE acts as a target 5G ProSe end UE, the 5G ProSe direct link is between the 5G ProSe UE-to-UE relay UE and the target 5G ProSe end UE, and the target 5G ProSe end UE has established direct communication with only one source 5G ProSe end UEs via the 5G ProSe UE-to-UE relay UE using the 5G ProSe direct link;

e) shall include the target end UE info set to the user info of the target 5G ProSe end UE, if the UE acts as a 5G ProSe UE-to-UE relay UE and, the 5G ProSe direct link is between the source 5G ProSe end UE and the 5G ProSe UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link; and f) may include the target end UE info set to the user info of the target 5G ProSe end UE, if the UE acts as a 5G ProSe UE-to-UE relay UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link;

in the PROSE DIRECT LINK MODIFICATION ACCEPT message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link.

If the PROSE DIRECT LINK MODIFICATION REQUEST message is to remove existing PC5 QoS flow(s) from the PC5 5G ProSe direct link, the target UE shall delete the PQFI(s) and the corresponding PC5 QoS parameters from the profile associated with the 5G ProSe direct link.

If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QoS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the target UE:

a) if acting as the 5G ProSe layer-3 UE-to-UE relay UE, shall perform the 5G ProSe direct link establishment procedure towards the target 5G ProSe layer-3 end UE as specified in clause 7.2.2.2; and after receiving the PROSE DIRECT LINK ESTABLISHMENT ACCEPT message from the target 5G ProSe layer-3 end UE, shall create a PROSE DIRECT LINK MODIFICATION ACCEPT message;

b) if acting as the target 5G ProSe layer-3 end UE, shall create a PROSE DIRECT LINK MODIFICATION ACCEPT message; and c) in the PROSE DIRECT LINK MODIFICATION ACCEPT message, the target UE:

1) if the UE acts as the target 5G ProSe layer-3 end UE:

i) shall include the source end UE info set to the user info of the source 5G ProSe layer-3 end UE and the target end UE info set to the user info of the target 5G ProSe layer-3 end UE; and ii) for Ethernet traffic, shall include the MAC address of the target 5G ProSe layer-3 end UE if the MAC address of the target 5G ProSe layer-3 end UE changed;

2) if the UE acts as the 5G ProSe layer-3 UE-to-UE relay UE:

i) shall include the target end UE info set to the user info of the target 5G ProSe layer-3 end UE;

ii) for IP traffic, may include the target 5G ProSe layer-3 end UE IP address IE set to the IP address of the additional target 5G ProSe layer-3 end UE; and iii) for Ethernet traffic, shall include the MAC address of the target 5G ProSe layer-3 end UE.

3) may include the PQFI(s) and the corresponding PC5 QoS parameters optionally including the ProSe identifier(s) for the PC5 QoS flow(s) that the target 5G ProSe layer-3 end UE accepts; and 4) may include the PC5 QoS rule(s) to indicate the packet filters of the PC5 QoS flow(s).

If the PROSE DIRECT LINK MODIFICATION REQUEST message is to establish 5G ProSe UE-to-UE relay communication with additional 5G ProSe layer-2 end UE using the existing 5G ProSe direct link between the 5G ProSe layer-2 end UE and 5G ProSe layer-2 UE-to-UE relay UE, the target UE:

a) if acting as the 5G ProSe layer-2 UE-to-UE relay UE, shall perform the 5G ProSe direct link establishment procedure towards the target 5G ProSe layer-2 end UE as specified in clause 7.2.2.2; and after receiving the PROSE DIRECT LINK ESTABLISHMENT ACCEPT message from the target 5G ProSe layer-2 end UE, shall create a PROSE DIRECT LINK MODIFICATION ACCEPT message;

b) if acting as the target 5G ProSe layer-2 end UE, shall create a PROSE DIRECT LINK MODIFICATION ACCEPT message; and c) in the PROSE DIRECT LINK MODIFICATION ACCEPT message, the target UE:

1) if the UE acts as the target 5G ProSe layer-2 end UE:

i) shall include the source end UE info set to the user info of the source 5G ProSe layer-2 end UE and the target end UE info set to the user info of the target 5G ProSe layer-2 end UE; or 2) if the UE acts as the 5G ProSe layer-2 UE-to-UE relay UE:

i) shall include the target end UE info set to the user info of the target 5G ProSe layer-2 end UE.

If the PROSE DIRECT LINK MODIFICATION REQUEST message is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the target UE:

a) if acting as the 5G ProSe layer-3 UE-to-UE relay UE, may initiate one of the following procedures towards the target 5G ProSe layer-3 end UE:

1) 5G ProSe direct link release procedure as specified in clause 7.2.6.2 to release the 5G ProSe direct link with the peer 5G ProSe layer-3 end UE; or 2) 5G ProSe direct link modification procedure as specified in clause 7.2.3.2 to remove the corresponding PC5 QoS flow(s), if the UE determines to keep the 5G ProSe direct link with the peer 5G ProSe layer-3 end UE; and b) shall create a PROSE DIRECT LINK MODIFICATION ACCEPT message, and in this message, the target UE:

1) shall include the source end UE info set to the user info of the source 5G ProSe layer-3 end UE, if the UE acts as the target 5G ProSe layer-3 end UE; or 2) shall include the target end UE info set to the user info of the target 5G ProSe layer-3 end UE, if the UE acts as the 5G ProSe layer-3 UE-to-UE relay UE.

If the 5G ProSe direct link is for 5G ProSe direct communication between the 5G ProSe remote UE and the 5G ProSe layer-3 UE-to-network relay UE, and if the initiating UE is the 5G ProSe remote UE, then the target UE (as the 5G ProSe layer-3 UE-to-network relay UE) performs the QoS flows handling procedure as specified in clause 8.2.6.3.3 and clause 8.2.6.4.2.

If the PROSE DIRECT LINK MODIFICATION REQUEST message is accepted by the target 5G ProSe end UE to trigger UE-to-UE relay reselection and the 5G PC5 direct link is between the 5G ProSe UE-to-UE relay UE and the target 5G ProSe end UE, the target UE acting as the target 5G ProSe end UE may perform the candidate 5G ProSe UE-to-UE relay discovery procedure as specified in clause 8a.2.3.3. The target UE shall set up a PC5 unicast link with the selected new 5G ProSe UE-to-UE relay UE, if no such PC5 unicast link already exists.

If the PROSE DIRECT LINK MODIFICATION REQUEST message is accepted to trigger the negotiated 5G ProSe layer-3 UE-to-UE relay reselection, the target UE shall respond with PROSE DIRECT LINK MODIFICATION ACCEPT message. In this message:

a) if the target UE acts as a target 5G ProSe layer-3 end UE and the 5G ProSe direct link is between the target 5G ProSe layer-3 end UE and the 5G ProSe layer-3 UE-to-UE relay UE, the target UE:

1) shall include the relay reselection indication;

2) shall include the newly selected 5G ProSe UE-to-UE relay UE user info ID;

3) shall include the initiating 5G ProSe end UE IP address; and 4) shall include the target 5G ProSe end UE IP address to be used with the newly selected 5G ProSe UE-to-UE relay UE, if IP communication is used; and b) if the target UE acts as a 5G ProSe layer-3 UE-to-UE relay UE and the 5G ProSe direct link is between the 5G ProSe layer-3 UE-to-UE relay UE and the source 5G ProSe layer-3 end UE, after receiving the PROSE DIRECT LINK MODIFICATION ACCEPT message from the target 5G ProSe layer-3 end UE, the target UE.

1) shall include the relay reselection indication;

2) shall include the newly selected 5G ProSe UE-to-UE relay UE user info ID;

3) shall include the target 5G ProSe end UE IP address; and 4) shall include the target 5G ProSe end UE IP address to be used with the newly selected 5G ProSe UE-to-UE relay UE, if IP communication is used.

If the PROSE DIRECT LINK MODIFICATION REQUEST message is accepted to trigger the negotiated 5G ProSe layer-2 UE-to-UE relay reselection, the target UE acting as the target 5G ProSe layer-2 end UE shall respond with PROSE DIRECT LINK MODIFICATION ACCEPT message. In this message:

a) shall include the new 5G ProSe UE-to-UE relay UE user info ID; and b) shall include the new LBSs of $K_{NRP}$ ID.

After the PROSE DIRECT LINK MODIFICATION ACCEPT message is generated, the target UE shall pass this message to the lower layers for transmission along with the initiating UE's layer-2 ID for 5G ProSe direct communication and the target UE's layer-2 ID for 5G ProSe direct communication.

If this procedure is performed for the negotiated 5G ProSe layer-3 UE-to-UE relay reselection, the target UE shall start timer T5096. The target UE shall not send a new PROSE DIRECT LINK MODIFICATION ACCEPT message to the same initiating UE while timer T5096 is running.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8. The target UE shall form the new $K_{NRP}$ ID from the new MSBs of $K_{NRP}$ ID received in the PROSE DIRECT LINK MODIFICATION REQUEST message and the new LSBs of $K_{NRP}$ ID included in the PROSE DIRECT LINK MODIFICATION ACCEPT message. The target UE shall replace the existing $K_{NRP}$ ID with the new $K_{NRP}$ ID. The target UE may include the new $K_{NRP}$ ID in DIRECT LINK ESTABLISHMENT REQUEST message with the initiating UE as specified in clause 7.2.2.2.

7.2.3.4 5G ProSe Direct Link Modification Procedure Completion by the Initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 QoS flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5 QoS flow(s) from the 5G ProSe direct link, the initiating UE shall provide the removed PQFI(s) along with the PC5 link identifier to the lower layer.

Upon receipt of the PROSE DIRECT LINK MODIFICATION ACCEPT message, if the initiating UE acts as the 5G ProSe layer-3 UE-to-UE relay UE and the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall send a PROSE DIRECT LINK ESTABLISHMENT ACCEPT message to the source 5G ProSe layer-3 end UE as specified in clause 7.2.2.3.

Upon receipt of the PROSE DIRECT LINK MODIFICATION ACCEPT message, if the initiating UE acts as the 5G ProSe layer-3 UE-to-UE relay UE and the PROSE DIRECT LINK MODIFICATION REQUEST message is to add new PC5 QoS flow(s) or modify any existing PC5 QoS flow(s) in the existing 5G ProSe direct link or to remove any PC5 QoS flow(s) from the existing 5G ProSe direct link between the 5G ProSe layer-3 end UE and 5G ProSe layer-3 UE-to-UE relay UE, the initiating UE shall send a PROSE DIRECT LINK MODIFICATION ACCEPT message to the source 5G ProSe layer-3 end UE as specified in clause 7.2.3.3.

When the 5G ProSe direct link is between the source 5G ProSe end UE and the 5G ProSe UE-to-UE relay UE, upon receiving PROSE DIRECT LINK MODIFICATION ACCEPT message, which includes relay reselection indication, and the PROSE DIRECT LINK MODIFICATION REQUEST message is for the negotiated 5G ProSe UE-to-UE relay reselection, the initiating UE, acting as the source 5G ProSe end UE, shall set up a PC5 unicast link with the newly selected 5G ProSe UE-to-UE relay UE whose user info ID is included in the PROSE DIRECT LINK MODIFICATION ACCEPT message, if no such PC5 unicast link already exists. If the initiating UE acts as a source 5G ProSe layer-3 end UE, the initiating UE shall create a PROSE DIRECT LINK MODIFICATION ACK message. In this message, the initiating UE:

a) shall include the relay reselection indication, source end UE IP address for new relay IE set to IP address of the source 5G ProSe layer-3 end UE's IP address to be used with the newly selected 5G ProSe layer-3 UE-to-UE relay UE and target end UE IP address IE set to the IP address of the target 5G ProSe layer-3 end UE, if IP communication is used.

When the 5G ProSe direct link is between the 5G ProSe layer-3 UE-to-UE relay UE and the target 5G ProSe layer-3 end UE, and the 5G ProSe layer-3 UE-to-UE relay UE receives PROSE DIRECT LINK MODIFICATION ACK message from the source 5G ProSe end UE which includes relay reselection indication, the 5G ProSe layer-3 UE-to-UE relay UE shall create a PROSE DIRECT LINK MODIFICATION ACK message. In this message, the 5G ProSe layer-3 UE-to-UE relay UE:

a) shall include the relay reselection indication, source end UE IP address for new relay IE set to the IP address of the source 5G ProSe layer-3 end UE to be used with the newly selected 5G ProSe layer-3 UE-to-UE relay UE, and source end UE IP address IE set to the IP address of the source 5G ProSe layer-3 end UE, if IP communication is used.

Upon receiving PROSE DIRECT LINK MODIFICATION ACCEPT message, that includes relay reselection indication, if the PROSE DIRECT LINK MODIFICATION REQUEST message is for relay reselection, the initiating UE shall form the new $K_{NRP}$ ID from the MSBs of $K_{NRP}$ ID included in the PROSE DIRECT LINK MODIFICATION REQUEST message and the LSBs of $K_{NRP}$ ID received in the PROSE DIRECT LINK MODIFICATION ACCEPT message. The initiating UE shall replace the existing $K_{NRP}$ ID with the new $K_{NRP}$ ID. The initiating UE may include the new $K_{NRP}$ ID in PROSE DIRECT LINK ESTABLISHMENT REQUEST message with the target UE as specified in clause 7.2.2.2 when the initiating UE reconnects with the same target UE.

After the PROSE DIRECT LINK MODIFICATION ACK message is generated, the initiating UE shall pass this message to the lower layers for transmission along with the initiating UE's layer-2 ID for 5G ProSe direct communication and the target UE's layer-2 ID for 5G ProSe direct communication.

If the source UE acknowledges the 5G ProSe direct link modification accept, then the source UE starts to receive and/or transmit traffic via the newly selected 5G ProSe UE-to-UE relay UE.

If the 5G ProSe direct link modification procedure is for 5G ProSe direct communication between the 5G ProSe layer-3 UE-to-UE relay UE and the target 5G ProSe layer-3 end UE, for Ethernet traffic, the PROSE DIRECT LINK MODIFICATION ACCEPT message contains target 5G ProSe layer-3 end UE MAC address, and the initiating UE acting as the 5G ProSe layer-3 UE-to-UE relay UE detects that the MAC address of the target 5G ProSe layer-3 end UE is not unique, i.e., the MAC address of the target 5G ProSe layer-3 end UE was also provided by another 5G ProSe layer-3 end UE in an existing ProSe 5G direct link, the 5G ProSe layer-3 UE-to-UE relay UE shall perform 5G ProSe direct link release procedure as specified in clause 7.2.6.

7.2.3.4a 5G ProSe Direct Link Modification Procedure Completion by the Target UE Upon receipt of the PROSE DIRECT LINK MODIFI-CATION ACK message, the target layer-3 5G ProSe end UE starts to receive traffic, transmit traffic, or both, via the newly selected 5G ProSe UE-to-UE relay UE and shall stop T5096.

Upon receipt of the PROSE DIRECT LINK MODIFI-CATION ACK message, the layer-3 5G ProSe UE-to-UE relay UE shall stop T5096.

[ . . . ]

10.3.6 ProSe Direct Link Modification Request 10.3.6.1 Message Definition

This message is sent by the UE to another peer UE to initiate the direct link modification procedure. See table 10.3.6.1.1.

Message type: PROSE DIRECT LINK MODIFICATION REQUEST
Significance: dual
Direction: UE to peer UE Table 10.3.6.1.1 of 3GPP TS 24.554 V18.4.0, Entitled "ProSe Direct Link Modification Request Message Content", is Reproduced as FIG. 14

10.3.6.2 QoS Rules

The UE may include this IE to indicate the PC5 QoS rules for the PC5 QoS flow(s) to be added or modified.

10.3.6.3 Source End UE Info

The UE shall include this IE to indicate the user info (i.e. application layer ID) of the source 5G ProSe end UE if:
  a) the UE acts as a 5G ProSe layer-3 UE-to-UE relay UE or 5G ProSe layer-2 UE-to-UE relay UE;
  b) the 5G ProSe direct link is between the 5G ProSe layer-3 UE-to-UE relay UE and the target 5G ProSe layer-3 end UE or between the 5G ProSe layer-2 UE-to-UE relay UE and the target 5G ProSe layer-2 end UE; and
  c) one of the following conditions is met:
    1) multiple source 5G ProSe layer-3 end UEs have established direct communication with the target 5G ProSe layer-3 end UE via the 5G ProSe layer-3 UE-to-UE relay UE using the same 5G ProSe direct link;
    2) an additional source 5G ProSe end UE requests to establish direct communication with the target 5G ProSe layer-3 end UE via the 5G ProSe layer-3 UE-to-UE relay UE using the same 5G ProSe direct link;
    3) one of the source 5G ProSe layer-3 end UEs requests to release the direct communication with the target 5G ProSe layer-3 end UE via the 5G ProSe layer-3 UE-to-UE relay UE using the same 5G ProSe direct link; or
    4) an additional source 5G ProSe end UE requests to establish direct communication with the target 5G ProSe layer-2 end UE via the 5G ProSe layer-2 UE-to-UE relay UE using the same 5G ProSe direct link.

The UE may include this IE to indicate the user info (i.e. application layer ID) of the source 5G ProSe end UE if:
  a) the UE acts as a 5G ProSe UE-to-UE relay UE;
  b) the 5G ProSe direct link is between the 5G ProSe UE-to-UE relay UE and the target 5G ProSe end UE; and
  c) only one source 5G ProSe end UE has established direct communication with the target 5G ProSe end UE via the 5G ProSe UE-to-UE relay UE using the 5G ProSe direct link.

10.3.6.4 Target End UE Info

The UE shall include this IE to indicate the user info of the target 5G ProSe end UE if:
  a) the UE acts as a source 5G ProSe layer-3 end UE or source 5G ProSe layer-2 end UE;
  b) the 5G ProSe direct link is between the source 5G ProSe layer-3 end UE and the 5G ProSe layer-3 UE-to-UE relay UE or between the source 5G ProSe layer-2 end UE and the 5G ProSe layer-2 UE-to-UE relay UE; and
  c) one of the following conditions is met:
    1) the source 5G ProSe layer-3 end UE have established direct communication with multiple target 5G ProSe layer-3 end UEs via the 5G ProSe layer-3 UE-to-UE relay UE using the same 5G ProSe direct link;
    2) the source 5G ProSe layer-3 end UE requests to establish direct communication with an additional target 5G ProSe layer-3 end UE via the 5G ProSe layer-3 UE-to-UE relay UE using the same 5G ProSe direct link;
    3) the source 5G ProSe layer-3 end UE requests to release the direct communication with one of the target 5G ProSe layer-3 end UEs via the 5G ProSe layer-3 UE-to-UE relay UE using the same 5G ProSe direct link; or
    4) the source 5G ProSe layer-2 end UE requests to establish direct communication with an additional target 5G ProSe layer-3 end UE via the 5G ProSe layer-2 UE-to-UE relay UE using the same 5G ProSe direct link.

The UE may include this IE to indicate the user info of the target 5G ProSe end UE if:
  a) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link.

The UE shall include this IE to indicate the user info of the target 5G ProSe end UE if:
  a) the UE acts as a 5G ProSe UE-to-UE relay UE and the 5G ProSe direct link is between the 5G ProSe UE-to-UE relay UE and the target 5G ProSe end UE.

10.3.6.5 Target End UE Layer-2 ID

The UE may include this IE if:
  a) the UE acts as a source 5G ProSe end UE and the 5G ProSe direct link is between the source 5G ProSe end UE and the 5G ProSe UE-to-UE relay UE to indicate the destination layer-2 ID of the target 5G ProSe End UE.

10.3.6.6 Void 10.3.6.7 Source 5G ProSe Layer-3 End UE MAC Address

The UE shall include this IE when the MAC address of the source 5G ProSe layer-3 end UE needs to be indicated.

10.3.6.8 Relay Reselection Indication

The UE shall include this IE if the 5G ProSe direct link modification request is to trigger the negotiated 5G ProSe UE-to-UE relay reselection,

10.3.6.9 List of Candidates U2U Relay UE User Info

The UE shall include this IE if the relay reselection is indicated.

10.3.6.10 List of Target UE IP Addresses

The UE shall include this IE to indicate the list of IP addresses of the target 5G ProSe end UEs, if relay reselection is indicated, and if:

a) the UE acts as a source 5G ProSe end UE, and the 5G ProSe direct link is between the source 5G ProSe end UE and the 5G ProSe UE-to-UE relay UE.

10.3.6.11 List of Candidates U2U Relay UE Layer-2 IDs

The UE may include this IE if the relay reselection is indicated.

10.3.6.12 Source End UE IP Address

The UE shall include this IE to indicate the IP address of the source 5G ProSe layer-3 end UE, if relay reselection is indicated, and if:

a) the UE acts as a 5G ProSe layer-3 UE-to-UE relay UE, and the 5G ProSe direct link is between the 5G ProSe layer-3 UE-to-UE relay UE and the target 5G ProSe layer-3 end UE.

10.3.6.13 New MSBs of $K_{NRP}$ ID

The UE shall include this IE if the relay reselection indication is included and the 5G ProSe direct link is between the source 5G ProSe layer-2 end UE and the target 5G ProSe layer-2 end UE.

[ . . . ]

11.3.19 Link Modification Operation Code

The purpose of the Link modification operation code information element is to indicate what the operation of the 5G ProSe direct link modification procedure triggered by initiating UE is. The Link modification operation code is a type 3 information element, with a length of 2 octets. The Link modification operation code information element is coded as shown in figure 11.3.19.1 and table 11.3.19.1.

Figure 11.3.19.1 of 3GPP TS 24.554 V18.4.0,
    Entitled "Link Modification Operation Code
    Information Element", is Reproduced as FIG. 15

Table 11.3.19.1 of 3GPP TS 24.554 V18.4.0,
    Entitled "Link Modification Operation Code
    Information Element", is Reproduced as FIG. 16

UE-to-UE (U2U) Relay was specified in Release 18. A relay UE may be used to support connectivity between an end UE and a peer UE if the end UE cannot communicate with the peer UE directly. A first end UE (i.e. source (5G ProSe UE-to-UE) end UE) could trigger a layer-2 link establishment procedure (as introduced in e.g. clause 6.7 of 3GPP TS 23.304) for supporting UE-to-UE relay communication between the first end UE and a second end UE (i.e. target (5G ProSe UE-to-UE) end UE) via a (5G ProSe UE-to-UE) relay UE. The relay UE could establish one PC5 link with the source end UE (e.g. on first PC5 hop) and one PC5 link with the target end UE (e.g. on second PC5 hop), respectively.

According to clause 10.3.6 and clause 11.3.19 of 3GPP TS 24.554, there is a mandatory information element called Link modification operation code in the PROSE DIRECT LINK MODIFICATION REQUEST message. The purpose of the Link modification operation code IE is to indicate the operation of the 5G ProSe direct link modification procedure triggered by the initiating UE. However, 3GPP TS 24.554 does not mention how to set the Link modification operation code IE if/when the 5G ProSe direct link modification procedure is to trigger the negotiated 5G ProSe layer-3 UE-to-UE relay reselection or the negotiated 5G ProSe layer-2 UE-to-UE relay reselection. To address the issue, some potential solutions may be considered.

For example, as specified in clause 11.3.46 of 3GPP TS 24.554, there is an IE called Relay reselection indication in the PROSE DIRECT LINK MODIFICATION REQUEST message. The purpose of the Relay reselection indication IE is to indicate whether the link modification procedure is for the negotiated 5G ProSe UE-to-UE relay reselection. Therefore, when the initiating UE (i.e., the source end UE and/or the relay UE) needs to send the PROSE DIRECT LINK MODIFICATION REQUEST message for negotiated relay reselection, the initiating UE may set the Link modification operation code IE to a value not used by other operations, such as a void value (i.e., 4 bits '0001' to '0010') and/or a reserved value (i.e., 4 bits '1111'). Additionally, the initiating UE includes the Relay reselection indication IE. Once the target UE receives the message, it may first check for the presence of the Relay reselection indication IE. If the Relay reselection indication IE is included, the target UE may then ignore the value in the Link modification operation code IE and determine that the message is for negotiated relay reselection.

As another example, when the initiating UE needs to send the PROSE DIRECT LINK MODIFICATION REQUEST message for negotiated relay reselection, the initiating UE may set the Link modification operation code IE to a specific value not used by other operations, such as a spare value (i.e., 4 bits '1011' to '1110'). In this way, the Relay reselection indication IE may be redundant. Thus, the initiating UE may not include the Relay reselection indication IE in the PROSE DIRECT LINK MODIFICATION REQUEST message. Once the target UE receives this message, it may check the value in the message and determine that the message is for negotiated relay reselection.

For the other example, the text proposal for the solution related to link modification operation code on top of 3GPP TS 24.554 could be as follows:

Start of Change

7.2.3.2 5G ProSe Direct Link Modification Procedure Initiated by Initiating UE

[ . . . ]

If the 5G ProSe direct link modification procedure is to trigger the negotiated 5G ProSe layer-3 UE-to-UE relay reselection, the initiating UE shall create a PROSE DIRECT LINK MODIFICATION REQUEST message. In this message:

a) If the initiating UE acts as a source 5G ProSe layer-3 end UE and the 5G ProSe direct link is between the source 5G ProSe layer-3 end UE and the 5G ProSe layer-3 UE-to-UE relay UE, the initiating UE:

1) shall include the relay reselection indication;

2) shall include the list of user info IDs of the candidates 5G ProSe UE-to-UE relay UEs supporting the same RSC used for the existing 5G ProSe direct link;

3) shall include the list of target 5G ProSe end UEs IP address/prefix, if IP communication is used; and 4) may include the list of layer-2 IDs of the candidates 5G ProSe UE-to-UE relay UEs supporting the same RSC used for the existing 5G ProSe direct link; and

5) shall include the link modification operation code set to "Negotiated relay reselection"; or b) If the initiating UE acts as a 5G ProSe layer-3 UE-to-UE relay UE and the 5G ProSe direct link is between the 5G ProSe layer-3 UE-to-UE relay UE and the target 5G ProSe end UE, the initiating UE:

1) shall include the relay reselection indication;

2) shall include the list of user info IDs of the candidates 5G ProSe UE-to-UE relay UEs supporting the same RSC used for the existing 5G ProSe direct link;

3) shall include the initiating source 5G ProSe UE IP address/prefix, if IP communication is used;

4) may include list of layer-2 IDs of the candidates 5G ProSe UE-to-UE relay UEs supporting the same RSC used for the existing 5G ProSe direct link; and 5) shall include the link modification operation code set to "Negotiated relay reselection".

If the 5G ProSe direct link modification procedure is to trigger the negotiated 5G ProSe layer-3 UE-to-UE relay reselection and the initiating UE acts as a 5G ProSe layer-3 UE-to-UE relay UE, the initiating UE shall create a PROSE DIRECT LINK MODIFICATION REQUEST message for every IP address/prefix of the target 5G ProSe layer-3 end UEs received on the associated PROSE DIRECT LINK MODIFICATION REQUEST message from the source 5G ProSe layer-3 end UE.

If the 5G ProSe direct link modification procedure is to trigger the negotiated 5G ProSe layer-2 UE-to-UE relay reselection, the initiating UE shall create a PROSE DIRECT LINK MODIFICATION REQUEST message. In this message:

a) shall include the relay reselection indication;

b) shall include the list of candidates 5G ProSe UE-to-UE relay UE user info ID;

c) shall include the new MSBs of $K_{NRP}$ ID; and d) may include the list of candidates 5G ProSe UE-to-UE relay UE layer-2 ID.

e) shall include the link modification operation code set to "Negotiated relay reselection".

[ . . . ]

11.3.19 Link Modification Operation Code

The purpose of the Link modification operation code information element is to indicate what the operation of the 5G ProSe direct link modification procedure triggered by initiating UE is. The Link modification operation code is a type 3 information element, with a length of 2 octets. The Link modification operation code information element is coded as shown in figure 11.3.19.1 and table 11.3.19.1.

Original Figure 11.3.19.1 of 3GPP TS 24.554 V18.4.0, Entitled "Link Modification Operation Code Information Element", is Reproduced as FIG. 15

Modified Table 11.3.19.13 of GPP TS 24.554 V18.4.0, Entitled "Link Modification Operation Code Information Element", is Presented as FIG. 17

End of Change

For the other example, the text proposal for the solution related to link modification operation code on top of TS 24.554 could be as follows:

Start of Change 7.2.3.2 5G ProSe Direct Link Modification Procedure Initiated by Initiating UE

[ . . . ]

If the 5G ProSe direct link modification procedure is to trigger the negotiated 5G ProSe layer-3 UE-to-UE relay reselection, the initiating UE shall create a PROSE DIRECT LINK MODIFICATION REQUEST message. In this message:

a) If the initiating UE acts as a source 5G ProSe layer-3 end UE and the 5G ProSe direct link is between the source 5G ProSe layer-3 end UE and the 5G ProSe layer-3 UE-to-UE relay UE, the initiating UE:

1) shall include the link modification operation code set to "Negotiated relay reselection";

2) shall include the list of user info IDs of the candidates 5G ProSe UE-to-UE relay UEs supporting the same RSC used for the existing 5G ProSe direct link;

3) shall include the list of target 5G ProSe end UEs IP address/prefix, if IP communication is used; and 4) may include the list of layer-2 IDs of the candidates 5G ProSe UE-to-UE relay UEs supporting the same RSC used for the existing 5G ProSe direct link; or b) If the initiating UE acts as a 5G ProSe layer-3 UE-to-UE relay UE and the 5G ProSe direct link is between the 5G ProSe layer-3 UE-to-UE relay UE and the target 5G ProSe end UE, the initiating UE:

1) shall include the link modification operation code set to "Negotiated relay reselection";

2) shall include the list of user info IDs of the candidates 5G ProSe UE-to-UE relay UEs supporting the same RSC used for the existing 5G ProSe direct link;

3) shall include the initiating source 5G ProSe UE IP address/prefix, if IP communication is used; and 4) may include list of layer-2 IDs of the candidates 5G ProSe UE-to-UE relay UEs supporting the same RSC used for the existing 5G ProSe direct link.

If the 5G ProSe direct link modification procedure is to trigger the negotiated 5G ProSe layer-3 UE-to-UE relay reselection and the initiating UE acts as a 5G ProSe layer-3 UE-to-UE relay UE, the initiating UE shall create a PROSE DIRECT LINK MODIFICATION REQUEST message for every IP address/prefix of the target 5G ProSe layer-3 end UEs received on the associated PROSE DIRECT LINK MODIFICATION REQUEST message from the source 5G ProSe layer-3 end UE.

If the 5G ProSe direct link modification procedure is to trigger the negotiated 5G ProSe layer-2 UE-to-UE relay reselection, the initiating UE shall create a PROSE DIRECT LINK MODIFICATION REQUEST message. In this message:

a) shall include the link modification operation code set to "Negotiated relay reselection";

b) shall include the list of candidates 5G ProSe UE-to-UE relay UE user info ID;

c) shall include the new MSBs of $K_{NRP}$ ID; and d) may include the list of candidates 5G ProSe UE-to-UE relay UE layer-2 ID.

[ . . . ]

10.3.6 ProSe Direct Link Modification Request 10.3.6.1 Message Definition

This message is sent by the UE to another peer UE to initiate the direct link modification procedure. See table 10.3.6.1.1.

Message type: PROSE DIRECT LINK MODIFICATION REQUEST

Significance: dual

Direction: UE to peer UE

Modified Table 10.3.6.1.1 of 3GPP TS 24.554
V18.4.0, Entitled "ProSe Direct Link Modification
Request Message Content", is Presented as FIG. 18

10.3.6.2 QoS Rules
The UE may include this IE to indicate the PC5 QoS rules
for the PC5 QoS flow(s) to be added or modified.
10.3.6.3 Source End UE Info
The UE shall include this IE to indicate the user info (i.e.
application layer ID) of the source 5G ProSe end UE if:
  a) the UE acts as a 5G ProSe layer-3 UE-to-UE relay UE
    or 5G ProSe layer-2 UE-to-UE relay UE;
  b) the 5G ProSe direct link is between the 5G ProSe
    layer-3 UE-to-UE relay UE and the target 5G ProSe
    layer-3 end UE or between the 5G ProSe layer-2
    UE-to-UE relay UE and the target 5G ProSe layer-2
    end UE; and
  c) one of the following conditions is met:
    1) multiple source 5G ProSe layer-3 end UEs have
      established direct communication with the target 5G
      ProSe layer-3 end UE via the 5G ProSe layer-3
      UE-to-UE relay UE using the same 5G ProSe direct
      link;
    2) an additional source 5G ProSe end UE requests to
      establish direct communication with the target 5G
      ProSe layer-3 end UE via the 5G ProSe layer-3
      UE-to-UE relay UE using the same 5G ProSe direct
      link;
    3) one of the source 5G ProSe layer-3 end UEs requests
      to release the direct communication with the target
      5G ProSe layer-3 end UE via the 5G ProSe layer-3
      UE-to-UE relay UE using the same 5G ProSe direct
      link; or
    4) an additional source 5G ProSe end UE requests to
      establish direct communication with the target 5G
      ProSe layer-2 end UE via the 5G ProSe layer-2
      UE-to-UE relay UE using the same 5G ProSe direct
      link.
The UE may include this IE to indicate the user info (i.e.
application layer ID) of the source 5G ProSe end UE if:
  a) the UE acts as a 5G ProSe UE-to-UE relay UE;
  b) the 5G ProSe direct link is between the 5G ProSe
    UE-to-UE relay UE and the target 5G ProSe end UE;
    and
  c) only one source 5G ProSe end UE has established
    direct communication with the target 5G ProSe end UE
    via the 5G ProSe UE-to-UE relay UE using the 5G
    ProSe direct link.
10.3.6.4 Target End UE Info
The UE shall include this IE to indicate the user info of
the target 5G ProSe end UE if:
  a) the UE acts as a source 5G ProSe layer-3 end UE or
    source 5G ProSe layer-2 end UE;
  b) the 5G ProSe direct link is between the source 5G
    ProSe layer-3 end UE and the 5G ProSe layer-3 UE-to-
    UE relay UE or between the source 5G ProSe layer-2
    end UE and the 5G ProSe layer-2 UE-to-UE relay UE;
    and
  c) one of the following conditions is met:
    1) the source 5G ProSe layer-3 end UE have established
      direct communication with multiple target 5G ProSe
      layer-3 end UEs via the 5G ProSe layer-3 UE-to-UE
      relay UE using the same 5G ProSe direct link;
    2) the source 5G ProSe layer-3 end UE requests to
      establish direct communication with an additional target 5G ProSe layer-3 end UE via the 5G ProSe
      layer-3 UE-to-UE relay UE using the same 5G ProSe
      direct link;
    3) the source 5G ProSe layer-3 end UE requests to
      release the direct communication with one of the
      target 5G ProSe layer-3 end UEs via the 5G ProSe
      layer-3 UE-to-UE relay UE using the same 5G ProSe
      direct link; or
    4) the source 5G ProSe layer-2 end UE requests to
      establish direct communication with an additional
      target 5G ProSe layer-3 end UE via the 5G ProSe
      layer-2 UE-to-UE relay UE using the same 5G ProSe
      direct link.
The UE may include this IE to indicate the user info of the
target 5G ProSe end UE if:
  a) the UE acts as a source 5G ProSe end UE, the 5G ProSe
    direct link is between the source 5G ProSe end UE and
    the 5G ProSe UE-to-UE relay UE, and the source 5G
    ProSe end UE has established direct communication
    with only one target 5G ProSe end UE via the 5G ProSe
    UE-to-UE relay UE using the 5G ProSe direct link.
The UE shall include this IE to indicate the user info of
the target 5G ProSe end UE if:
  a) the UE acts as a 5G ProSe UE-to-UE relay UE and the
    5G ProSe direct link is between the 5G ProSe UE-to-
    UE relay UE and the target 5G ProSe end UE.
10.3.6.5 Target end UE layer-2 ID
The UE may include this IE if:
  a) the UE acts as a source 5G ProSe end UE and the 5G
    ProSe direct link is between the source 5G ProSe end
    UE and the 5G ProSe UE-to-UE relay UE to indicate
    the destination layer-2 ID of the target 5G ProSe End
    UE.
10.3.6.6 Void
10.3.6.7 Source 5G ProSe Layer-3 End UE MAC Address
The UE shall include this IE when the MAC address of
the source 5G ProSe layer-3 end UE needs to be indicated.
10.3.6.8 Void
[ . . . ]
11.3.19 Link Modification Operation Code
The purpose of the Link modification operation code
information element is to indicate what the operation of the
5G ProSe direct link modification procedure triggered by
initiating UE is. The Link modification operation code is a
type 3 information element, with a length of 2 octets. The
Link modification operation code information element is
coded as shown in figure 11.3.19.1 and table 11.3.19.1.

Original Figure 11.3.19.1 of 3GPP TS 24.554
V18.4.0, Entitled "Link Modification Operation
Code Information Element", is Reproduced as FIG.
15

Modified Table 11.3.19.1 of 3GPP TS 24.554
V18.4.0, Entitled "Link Modification Operation
Code Information Element", is Reproduced as FIG.
19

End of Change

Figure 20:
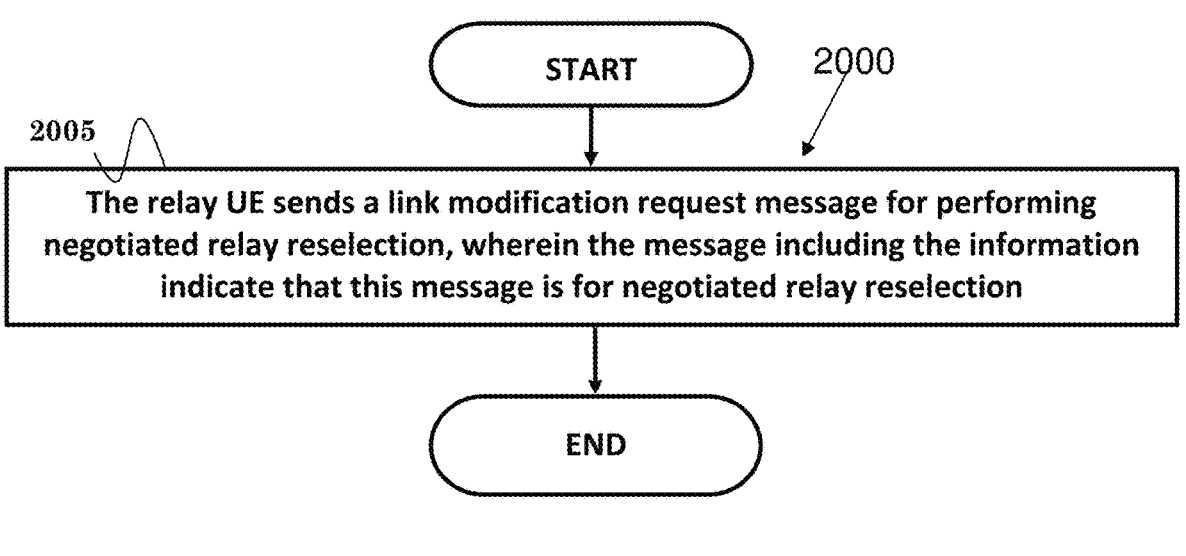
FIG. 20 is a flow chart according to one exemplary embodiment.

FIG. 20 is a flow chart 2000 for a relay UE. In step 2005,
the relay UE sends a link modification request message for
performing negotiated relay reselection, wherein the mes-
sage including the information indicate that this message is
for negotiated relay reselection.
In one embodiment, link modification request message
sent by the relay UE could be a PROSE DIRECT LINK MODIFICATION REQUEST message. The information could be an information element (IE) or a combination of information elements. The information could be a link modification operation code IE or a combination of the link modification operation code IE and the relay reselection IE.

Referring back to FIGS. 3 and 4, in one exemplary embodiment from the perspective of a relay UE. The relay UE 300 includes a program code 312 stored in the memory 310. The CPU 308 could execute program code 312 to enable the relay UE to sends a link modification request message for performing negotiated relay reselection, wherein the message including the information indicate that this message is for negotiated relay reselection. Furthermore, the CPU 308 can execute the program code 312 to perform all of the above-described actions and steps or others described herein.

Figure 21:
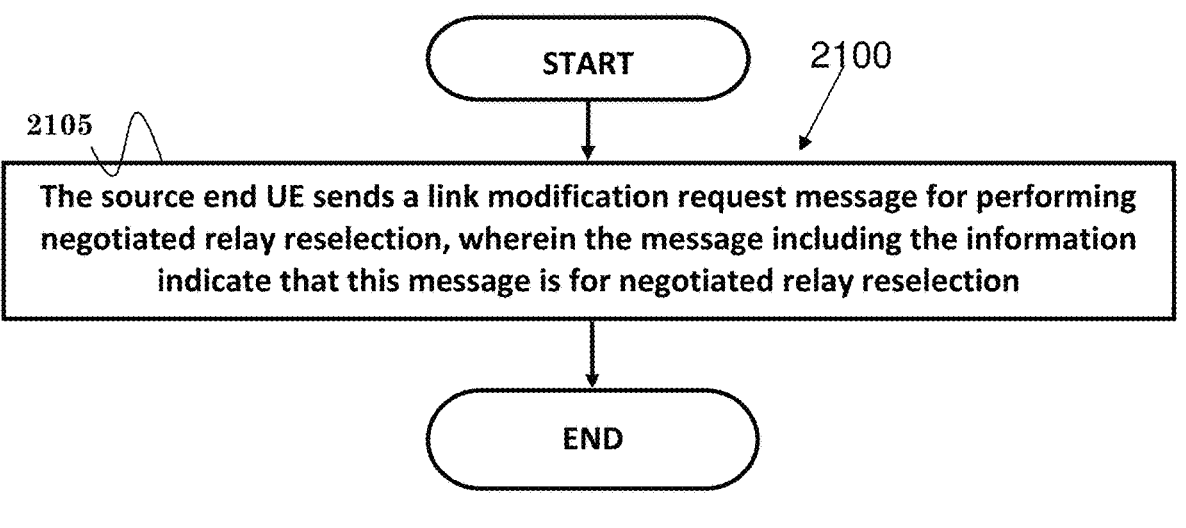
FIG. 21 is a flow chart according to one exemplary embodiment.

FIG. 21 is a flow chart 2100 for a source UE. In step 2105, the source end UE sends a link modification request message for performing negotiated relay reselection, wherein the message including the information indicate that this message is for negotiated relay reselection.

In one embodiment, the link modification request message sent by the source end UE could be a PROSE DIRECT LINK MODIFICATION REQUEST message. The information could be an information element (IE) or a combination of information elements. The information could be a link modification operation code IE or a combination of the link modification operation code IE and the relay reselection IE.

Referring back to FIGS. 3 and 4, in one exemplary embodiment from the perspective of a source UE. The source UE 300 includes a program code 312 stored in the memory 310. The CPU 308 could execute program code 312 to enable the source UE to send a link modification request message for performing negotiated relay reselection, wherein the message including the information indicate that this message is for negotiated relay reselection. Furthermore, the CPU 308 can execute the program code 312 to perform all of the above-described actions and steps or others described herein.

Figure 22:
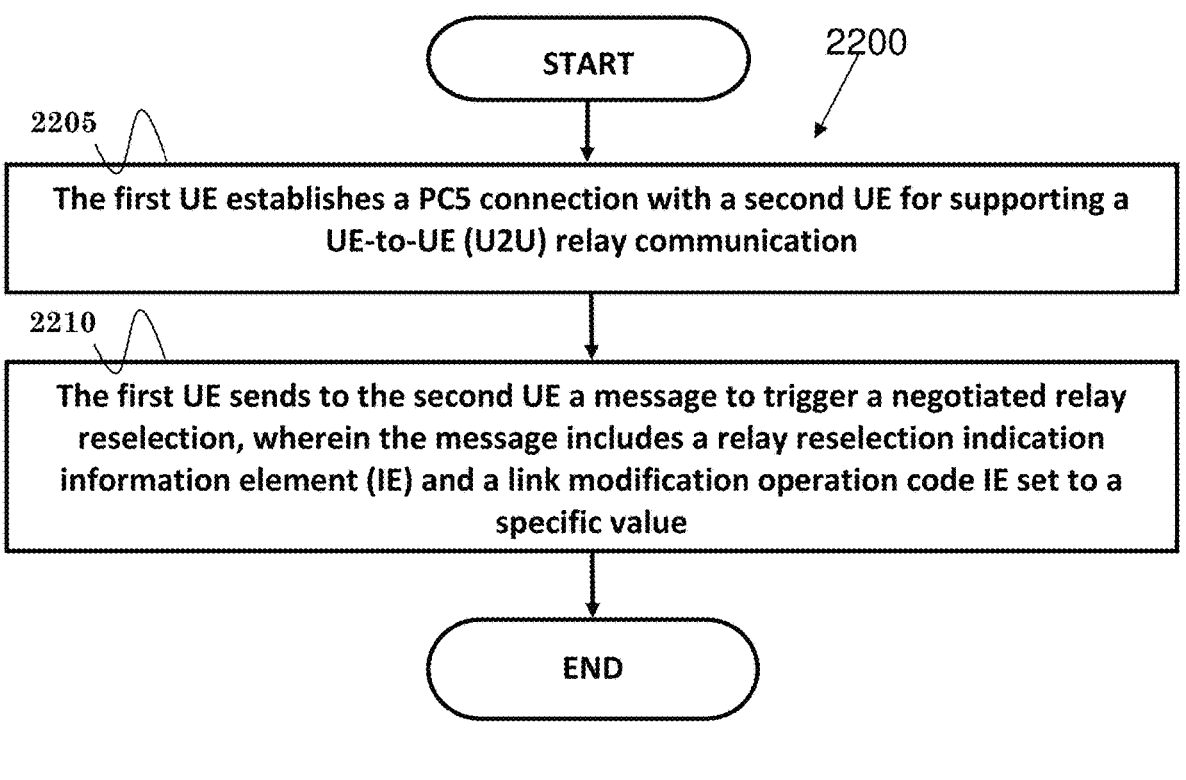
FIG. 22 is a flow chart according to one exemplary embodiment.

FIG. 22 is a flow chart 2200 for a first UE. In step 2205, the first UE establishes a PC5 connection with a second UE for supporting a UE-to-UE (U2U) relay communication. In step 2210, the first UE sends to the second UE a message to trigger a negotiated relay reselection, wherein the message includes a relay reselection indication information element (IE) and a link modification operation code IE set to a specific value.

In one embodiment, the message sent by the first UE could be a link modification request message or a PROSE DIRECT LINK MODIFICATION REQUEST message. The specific value could be a void value.

In one embodiment, the first UE could be a source end UE, and the second UE could be a relay UE. Alternatively, the first UE could be a relay UE, and the second UE could be a target end UE.

Referring back to FIGS. 3 and 4, in one exemplary embodiment from the perspective of a first UE. The first UE 300 includes a program code 312 stored in the memory 310. The CPU 308 could execute program code 312 to enable the first UE (i) to establish a PC5 connection with a second UE for supporting a UE-to-UE (U2U) relay communication, and (ii) to send to the second UE a message to trigger a negotiated relay reselection, wherein the message includes a relay reselection indication information element (IE) and a link modification operation code IE set to a specific value.

Furthermore, the CPU 308 can execute the program code 312 to perform all of the above-described actions and steps or others described herein.

Figure 23:
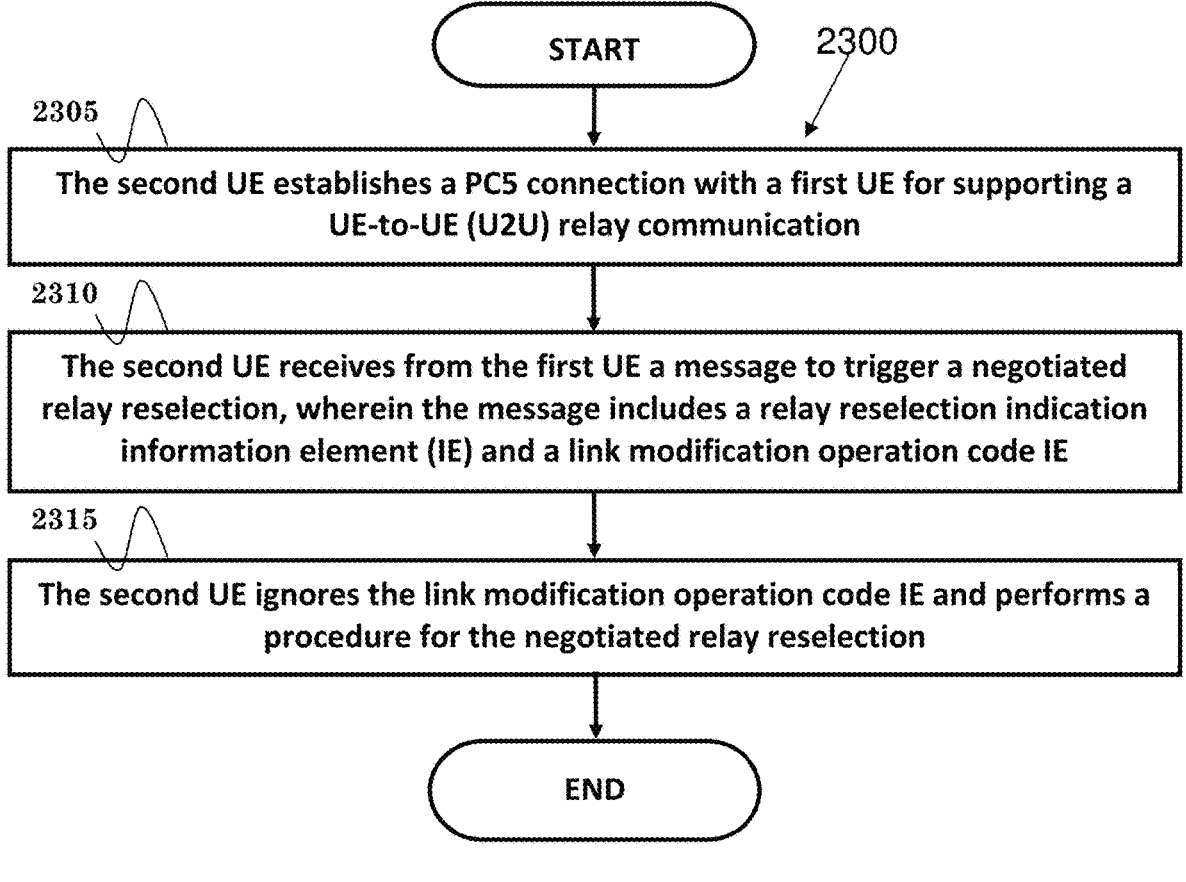
FIG. 23 is a flow chart according to one exemplary embodiment.

FIG. 23 is a flow chart 2300 for a second UE. In step 2305, the second UE establishes a PC5 connection with a first UE for supporting a UE-to-UE (U2U) relay communication. In step 2310, the second UE receives from the first UE a message to trigger a negotiated relay reselection, wherein the message includes a relay reselection indication information element (IE) and a link modification operation code IE. In step 2315, the second UE ignores the link modification operation code IE and performs a procedure for the negotiated relay reselection.

In one embodiment, the message received from the first UE could be a link modification request message or a PROSE DIRECT LINK MODIFICATION REQUEST message. The value of the link modification operation code IE could be set to a void value.

In one embodiment, the first UE could be a source end UE, and the second UE is a relay UE. Alternatively, the first UE could be a relay UE, and the second UE could be a target end UE.

Referring back to FIGS. 3 and 4, in one exemplary embodiment from the perspective of a second UE. The second UE 300 includes a program code 312 stored in the memory 310. The CPU 308 could execute program code 312 to enable the second UE (i) to establish a PC5 connection with a first UE for supporting a UE-to-UE (U2U) relay communication, (ii) to receive from the first UE a message to trigger a negotiated relay reselection, wherein the message includes a relay reselection indication information element (IE) and a link modification operation code IE, and (iii) to ignore the link modification operation code IE and performs a procedure for the negotiated relay reselection. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a second User Equipment (UE), comprising:

the second UE establishes a PC5 connection with a first UE for supporting a UE-to-UE (U2U) relay communication;

the second UE receives from the first UE a message to trigger a negotiated relay reselection in a link modification procedure, wherein the message includes a relay reselection indication information element (IE) and a link modification operation code IE;

the second UE ignores the link modification operation code IE and performs a procedure for the negotiated relay reselection; and the second UE transmits a response message to the first UE in the link modification procedure.

2. The method of claim 1, wherein the message received from the first UE is a link modification request message or a PROSE DIRECT LINK MODIFICATION REQUEST message, and the response message is a link modification accept message or a PROSE DIRECT LINK MODIFICATION ACCEPT.

3. The method of claim 1, wherein a value of the link modification operation code IE is set to a void value.

4. The method of claim 1, wherein the first UE is a source end UE and the second UE is a relay UE.

5. The method of claim 1, wherein the first UE is a relay UE and the second UE is a target end UE.

6. A second User Equipment (UE), comprising:

a control circuit;

a processor installed in the control circuit; and a memory installed in the control circuit and operatively coupled to the processor;

wherein the processor is configured to execute a program code stored in the memory to:

establish a PC5 connection with a first UE for supporting a UE-to-UE (U2U) relay communication;

receive from the first UE a message to trigger a negotiated relay reselection in a link modification procedure, wherein the message includes a relay reselection indication information element (IE) and a link modification operation code IE;

ignore the link modification operation code IE and performs a procedure for the negotiated relay reselection; and transmit a response message to the first UE in the link modification procedure.

7. The second UE of claim 6, wherein the message received from the first UE is a link modification request message or a PROSE DIRECT LINK MODIFICATION REQUEST message, and the response message is a link modification accept message or a PROSE DIRECT LINK MODIFICATION ACCEPT.

8. The second UE of claim 6, wherein a value of the link modification operation code IE is set to a void value.

9. The second UE of claim 6, wherein the first UE is a source end UE and the second UE is a relay UE.

10. The second UE of claim 6, wherein the first UE is a relay UE and the second UE is a target end UE.

\* \* \* \* \*